(12) United States Patent
Morimiya et al.

(10) Patent No.: US 8,698,758 B2
(45) Date of Patent: Apr. 15, 2014

(54) INFORMATION PROCESSING APPARATUS, METHOD, AND PROGRAM THAT DETECTS THREE-DIMENSIONAL COORDINATES AND OUTPUTS CORRESPONDING AUDIO

(75) Inventors: Yuji Morimiya, Chiba (JP); Naoaki Fujimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 652 days.

(21) Appl. No.: 12/686,678

(22) Filed: Jan. 13, 2010

(65) Prior Publication Data
US 2010/0182231 A1    Jul. 22, 2010

(30) Foreign Application Priority Data
Jan. 20, 2009 (JP) ................. 2009-009439

(51) Int. Cl.
*G06F 3/041* (2006.01)

(52) U.S. Cl.
USPC ............................. 345/173; 381/61

(58) Field of Classification Search
USPC ............ 345/173–184; 178/18.01–20.03; 381/61–65, 332–334; 340/407.1–407.2; 341/22–34
See application file for complete search history.

(56) References Cited

U.S. PATENT DOCUMENTS

| | | | |
|---|---|---|---|
| 2006/0062382 A1* | 3/2006 | Ronkainen | 379/433.06 |
| 2008/0122798 A1 | 5/2008 | Koshiyama et al. | |
| 2008/0278450 A1* | 11/2008 | Lashina | 345/173 |
| 2009/0058829 A1* | 3/2009 | Kim et al. | 345/173 |

FOREIGN PATENT DOCUMENTS

JP     2008-117371     5/2008

* cited by examiner

*Primary Examiner* — Liliana Cerullo
(74) *Attorney, Agent, or Firm* — Oblon, Spivak, McClelland, Maier & Neustadt, L.L.P.

(57) ABSTRACT

An information processing apparatus includes a sensor portion, a judgment portion, and an output portion. The sensor portion detects three-dimensional coordinates designated by a spatially-apart detection target object. The judgment portion determines an area designated in advance, that includes the three-dimensional coordinates detected by the sensor portion. The output portion outputs, based on a result of the judgment by the judgment portion, audio corresponding to audio information from a position corresponding to at least two-dimensional coordinates out of the three-dimensional coordinates.

14 Claims, 29 Drawing Sheets

FIG.3A  X–Z Sensor panel
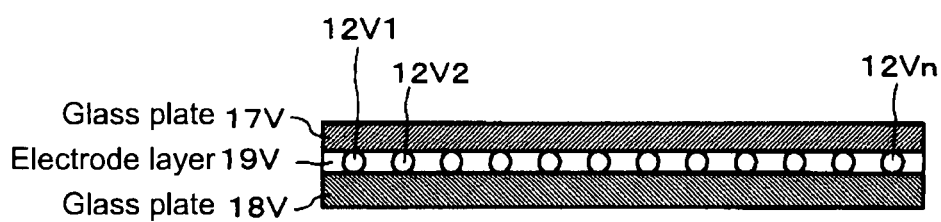
FIG.3B  Y–Z Sensor panel

Belonging to area R1

Output of audio of left-hand (L) channel from speakers SP1 and SP2

Belonging to area R2

Output of audio of left-hand (L) channel from speaker SP8
Output of audio of right-hand (R) channel from speaker SP9

Belonging to area R3

Output of audio of right-hand (R) channel from speakers SP15 and SP16

Kirchhoff integration formula

$$p(r_i) = \int_s \left( p(r_j) \frac{G_{ij}}{n} + j\omega\rho u_n(r_j) G_{ij} \right) ds \quad \cdots (1)$$

provided that $$G_{ij} = \frac{\exp(-jk|r_i - r_j|)}{4\pi|r_i - r_j|} \quad \cdots (2)$$

$$p(r_i) = \sum_{j=1}^{N} p(r_i) \int_{s_j} \frac{G_{ij}}{n} ds + j\omega\rho \sum_{j=1}^{N} u_n(r_j) \int_{s_j} G_{ij} ds \quad \cdots (3)$$

Evaluation function

$$J = \sum_{j=1}^{2N} \left( P_j - \sum_{i=1}^{M} H_i C_{ij} \right)^2 \quad \cdots (4)$$

$P_j$ : Transfer function between sound source in original sound field and sound-receiving point j $$\frac{J}{H_i} = 0 \quad (i = 1, 2, \cdots, M) \quad \cdots (5)$$

FIG.13

Example of audio information stored in audio information storage portion 407

| Top layer | : Accompaniment part |
|---|---|
| Upper left (LU) | Treble part of string instrument |
| Upper right (RU) | Treble part of brass wind |
| Lower left (LD) | Basso of string instrument |
| Lower right (RD) | Basso of brass wind |
| Medium layer | : Part of accompaniment part and solo part |
| Upper left (LU) | String instrument and treble part of flute |
| Upper right (RU) | Brass wind and treble part of xylophone |
| Lower left (LD) | String instrument and basso of woodwind instrument |
| Lower right (RD) | Brass wind and basso of female vocal |
| Bottom layer | : Solo part |
| Upper left (LU) | Harp and flute |
| Upper right (RU) | Harp and xylophone |
| Lower left (LD) | Woodwind instrument and female vocal |
| Lower right (RD) | Xylophone and female vocal |

FIG.21

Input from sensor portion 10: $V = (X, Y, Z)$ ⋯(1)

Mix parameters : $v = (x, y, z)$ ⋯(2)

$x = x' + (X - x') * \alpha$ ⋯(3)

$y = y' + (Y - y') * \alpha$ ⋯(4)

$z = z' + (Z - z') * \alpha 1$ ⋯(5)

($\alpha = 0.00004$, $\alpha \neq \alpha 1$)

Start point V1 = (X1, Y1, Z1)   ···(1)

End point V2 = (X2, Y2, Z2)   ···(2)

$x(t) = \exp(-\beta t) \times (X1-X2) + X2$   ···(3)

$y(t) = \exp(-\beta t) \times (Y1-Y2) + Y2$   ···(4)

$z(t) = \exp(-\beta t) \times (Z1-Z2) + Z2$   ···(5)

Value $\beta$ is determined by $\alpha$, provided that $\beta > 0$

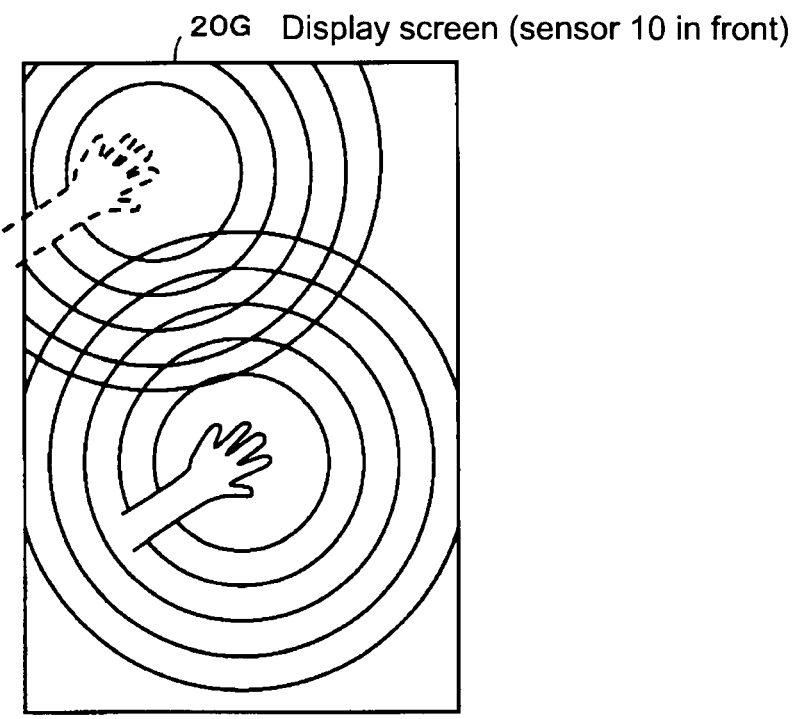
FIG.29
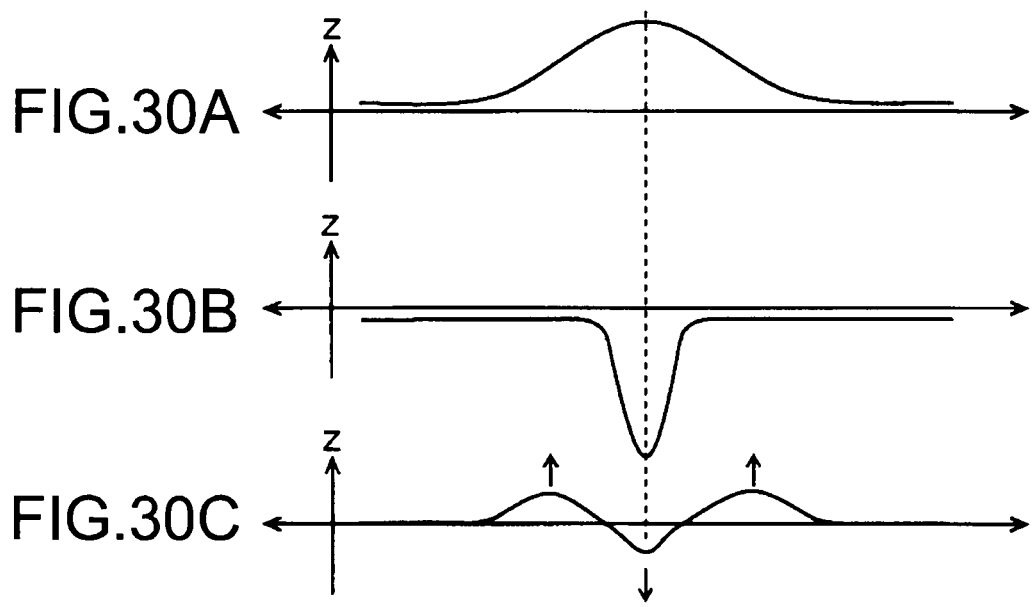
FIG.30A
FIG.30B
FIG.30C

INFORMATION PROCESSING APPARATUS, METHOD, AND PROGRAM THAT DETECTS THREE-DIMENSIONAL COORDINATES AND OUTPUTS CORRESPONDING AUDIO

BACKGROUND OF THE INVENTION

1. Field of the Invention

The present invention relates to an apparatus, method, and program for processing information signals of audio information and the like based on an operational input made by a user, for example.

2. Description of the Related Art

From the past, an operation button or a touch panel is generally used when a user performs some kind of an input. In the case of a touch panel, combined with a flat-panel screen of an LCD (Liquid Crystal Display) and the like, operational inputs can be made as if actually pressing a button icon or the like displayed on a display screen.

Those input operations presuppose touching or pressurization on a plane of an operation button or a screen of the touch panel. Therefore, limited operations such as touching and pressurization on the plane have been used for the operational inputs. Moreover, applications have been limited to a structure with a touchable plane.

Thus, there have been problems that a vibration or force due to the touching or pressurization inhibits performance of an apparatus and that a contact surface becomes dirty or is damaged.

As a technique for solving the problems described above, the applicant has disclosed an approach detection type information display device in Japanese Patent Application Laid-open No. 2008-117371 (hereinafter, referred to as Patent Document 1). In Patent Document 1, a sensor means including a sensor panel on which a plurality of line electrodes or point electrodes are arranged in two orthogonal directions, for example, is used.

Further, the sensor means detects a distance between a sensor panel surface including the plurality of electrodes and a detection target object such as a hand or finger of a user that is spatially apart from the panel surface by detecting a capacitance corresponding to the distance for the plurality of electrodes.

In other words, the capacitance between the plurality of electrodes on the sensor panel and a contact point varies depending on a spatial distance between a position of the hand or finger of the user and the panel surface. In this regard, a threshold value is set to the spatial distance between the position of the finger of the user and the panel surface so that whether the finger has approached or moved away more than that distance can be detected by detecting a change of the capacitance corresponding to the distance.

In particular, Patent Document 1 discloses a technique of improving a capacitance detection sensitivity by changing an interval between the electrodes for detecting the capacitance based on the distance between the detection target object and the sensor panel surface.

According to the techniques described above, a switch input can be made without touching the sensor panel. Moreover, since the plurality of line electrodes or point electrodes are arranged on the sensor panel in the two orthogonal directions, it is possible to spatially detect movements of the hand or finger in directions along the panel surface to thus enable operational inputs to be made in accordance with the spatial movements of the hand or finger.

SUMMARY OF THE INVENTION

The sensor means disclosed in Patent Document 1 above is capable of receiving operational inputs from a user in a non-contact state and also realizing an unprecedented input means.

It is conceivable to effectively use the characteristics of the sensor means described above and structure an information processing apparatus that carries out information processing in accordance with an operational input from a user received via the sensor means.

In view of the circumstances described above, there is a need to effectively process information signals of audio information and the like based on an operational input (gesture) corresponding to a spatial movement of a hand or the like of a user.

According to an embodiment of the present invention, there is provided an information processing apparatus, including:

a sensor means for detecting three-dimensional coordinates designated by a spatially-apart detection target object;

a judgment means for judging an area designated in advance, that includes the three-dimensional coordinates detected by the sensor means; and an output means for outputting, based on a result of the judgment by the judgment means, audio corresponding to audio information from a position corresponding to at least two-dimensional coordinates out of the three-dimensional coordinates.

According to the information processing apparatus of this embodiment, the three-dimensional coordinates within a predetermined space designated by the detection target object such as a hand of a user are detected by the sensor means. The area designated in advance, that includes the three-dimensional coordinates detected by the sensor means is determined by the judgment means.

Further, based on the result of the judgment by the judgment means, the audio corresponding to the audio information is output by the output means from the position corresponding to at least the two-dimensional coordinates (position corresponding to two-dimensional coordinates) out of the three-dimensional coordinates.

With this structure, audio corresponding to predetermined audio information can be effectively output in accordance with an operational input (gesture of user) corresponding to a movement of the detection target object such as a hand within a predetermined space.

According to the embodiment of the present invention, it is possible to effectively process information signals of audio information and the like based on an operational input (gesture of user) corresponding to a spatial movement of a detection target object such as a hand.

These and other objects, features and advantages of the present invention will become more apparent in light of the following detailed description of best mode embodiments thereof, as illustrated in the accompanying drawings.

BRIEF DESCRIPTION OF DRAWINGS

FIG. 3 are cross-sectional side views of an X-Z sensor panel and a Y-Z sensor panel of this embodiment;

FIG. 13 is a diagram showing a Kirchhoff integration formula;

FIG. 21 is a diagram for explaining a structure of audio information stored in an audio information storage portion;

FIG. 29 is a diagram for explaining a case where rings are generated on a displayed image in accordance with a designation position in the three-dimensional coordinate space designated by the detection target object such a hand of a user;

FIG. 30 are diagrams for explaining specific examples of a physics model for generating rings on the displayed image;

DESCRIPTION OF PREFERRED EMBODIMENTS

Hereinafter, an apparatus, a method, and a program according to an embodiment of the present invention will be described with reference to the drawings. In the embodiment described below, used as a sensor means is a sensor means for detecting a capacitance to thus detect a distance from a detection target object, that has been disclosed in Japanese Patent Application Laid-open No. 2008-117371 (hereinafter, referred to as Patent Document 1). Moreover, the detection target object assumes a hand or finger of an operator.

(Structure of Information Processing Apparatus)

Figure 1:
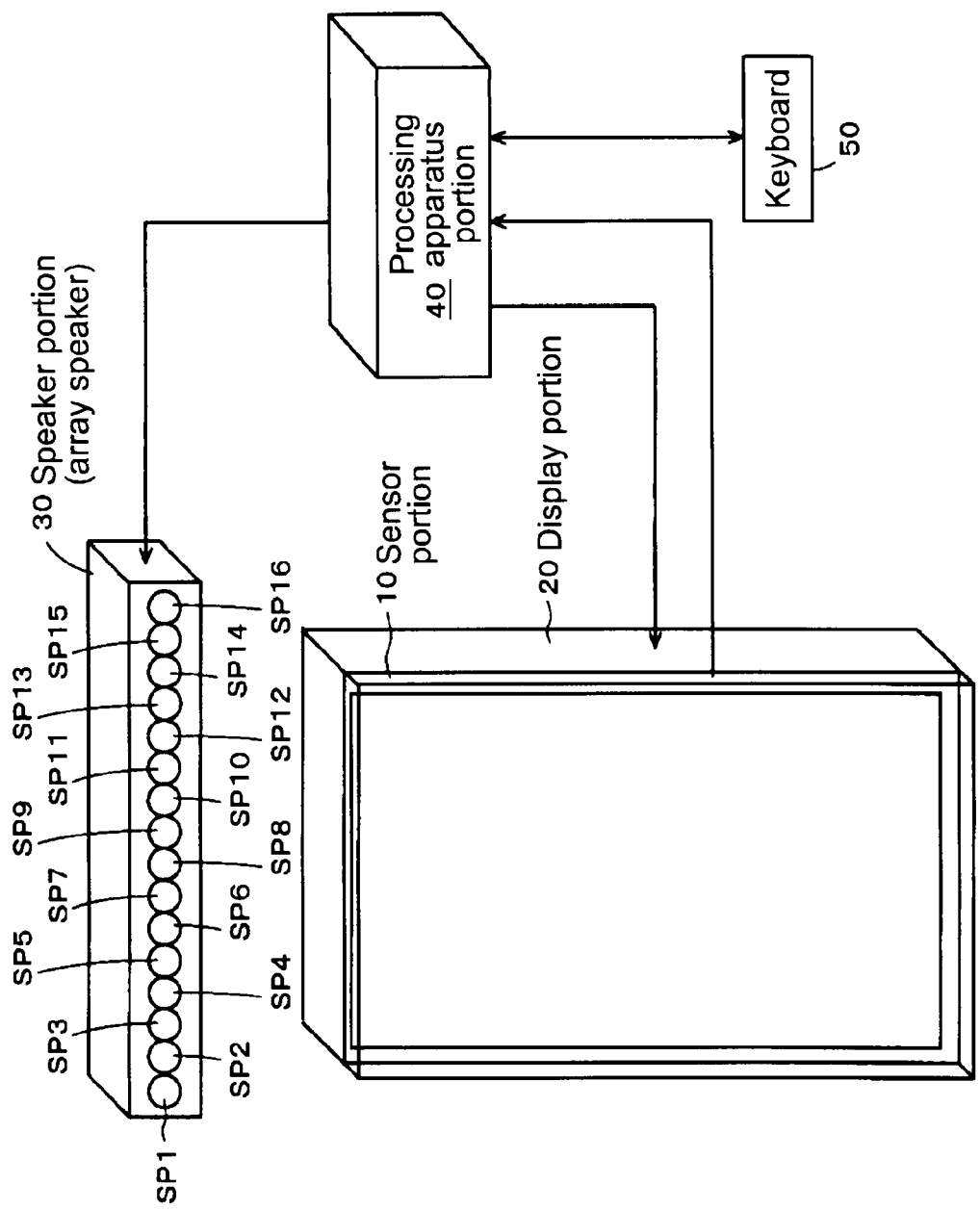
FIG. 1 is a diagram for explaining a structural example of an information processing apparatus (information processing system) to which an embodiment of the present invention is applied.

FIG. 1 is a diagram showing a structural example of an information processing apparatus (information processing system) of this embodiment. As shown in FIG. 1, the information processing apparatus of this embodiment is structured by connecting a sensor portion 10, a display portion 20, a speaker portion 30, and a keyboard 50 to a processing apparatus portion 40 using, for example, a connection cable.

The sensor portion 10 receives an operational input from a user and supplies the input to the processing apparatus portion 40. The sensor portion 10 is capable of detecting a spatial distance from a detection target object such as a hand.

Specifically, the sensor portion 10 outputs a sensor detection output corresponding to the spatial distance between the sensor portion 10 and the detection target object such as a hand or a finger. In this embodiment, the sensor portion 10 includes a rectangular sensor panel 10P of a predetermined size that is constituted of a two-dimensional plane as will be described later and detects a distance between a sensor panel surface and the detection target object.

Further, in this embodiment, the sensor portion 10 is capable of independently outputting a sensor detection output corresponding to the distance from the sensor panel surface to the detection target object at a plurality of positions in lateral and longitudinal directions on the sensor panel surface. As a result, in this embodiment, the sensor portion 10 can detect where on the sensor panel surface the detection target object is positioned.

In other words, when the lateral direction and the longitudinal direction on the sensor panel surface are an x-axis direction and a y-axis direction, respectively, and a direction orthogonal to the sensor panel surface is a z-axis direction, the spatial distance of the detection target object is detected as a z-axis coordinate value. In addition, a spatial position of the detection target object on the sensor panel is detected as x- and y-axis coordinate values.

The display portion 20 is constituted of, for example, a CRT (Cathode Ray Tube), an LCD (Liquid Crystal Display), an organic EL (Electroluminescence) panel, or a PDP (Plasma Display Panel).

In this embodiment, for the display portion 20, a so-called flat-screen display panel such as an LCD, an organic EL panel, and a PDP is used. As the display portion 20, a display portion having a screen size of 52 V is placed longitudinally. It should be noted that various screen sizes and arrangements may be adopted for the display portion 20.

In this embodiment, the speaker portion 30 is a so-called array speaker in which 16 speakers SP1 to SP16 are aligned in the lateral direction (horizontal direction).

The processing apparatus portion 40 is, for example, a personal computer (hereinafter, abbreviated to PC). The processing apparatus portion 40 stores content data to be reproduced, such as audio information (audio signal) and video information (video signal), in its own memory such as a hard disk.

The processing apparatus portion 40 receives an operational input from a user via the sensor portion 10. The sensor detection output from the sensor portion 10 corresponds to the spatial position of the detection target object on the sensor panel surface (x, y coordinates) and the spatial distance thereof (z coordinate).

Moreover, based on the received operational input, the processing apparatus portion 40 emits audio corresponding to predetermined audio information from the speakers of the speaker portion 30 or displays a video corresponding to predetermined video information on the display screen of the display portion 20.

In this case, the processing apparatus portion 40 carries out processing of changing a position of emitting audio, mixing audio signals, imparting a desired effect to a displayed video, and the like in accordance with the received operational input.

The keyboard 50 includes alphabet keys, numeric keys, various function keys, and the like and is capable of supplying, upon receiving an instruction input from the user, the instruction input to the processing apparatus portion 40.

The processing apparatus portion 40 is capable of maintaining a program executed by the processing apparatus portion 40 or performing various settings and adjustments with respect to the processing apparatus portion 40, based on the instruction input from the user received via the keyboard 50.

As described above, the information processing apparatus of this embodiment is capable of emitting audio from the speakers of the speaker portion 30 and displaying a video on the display screen of the display portion 20 based on an operational input received via the sensor portion 10.

(Descriptions on Structure of Sensor Portion 10)

Figure 2:
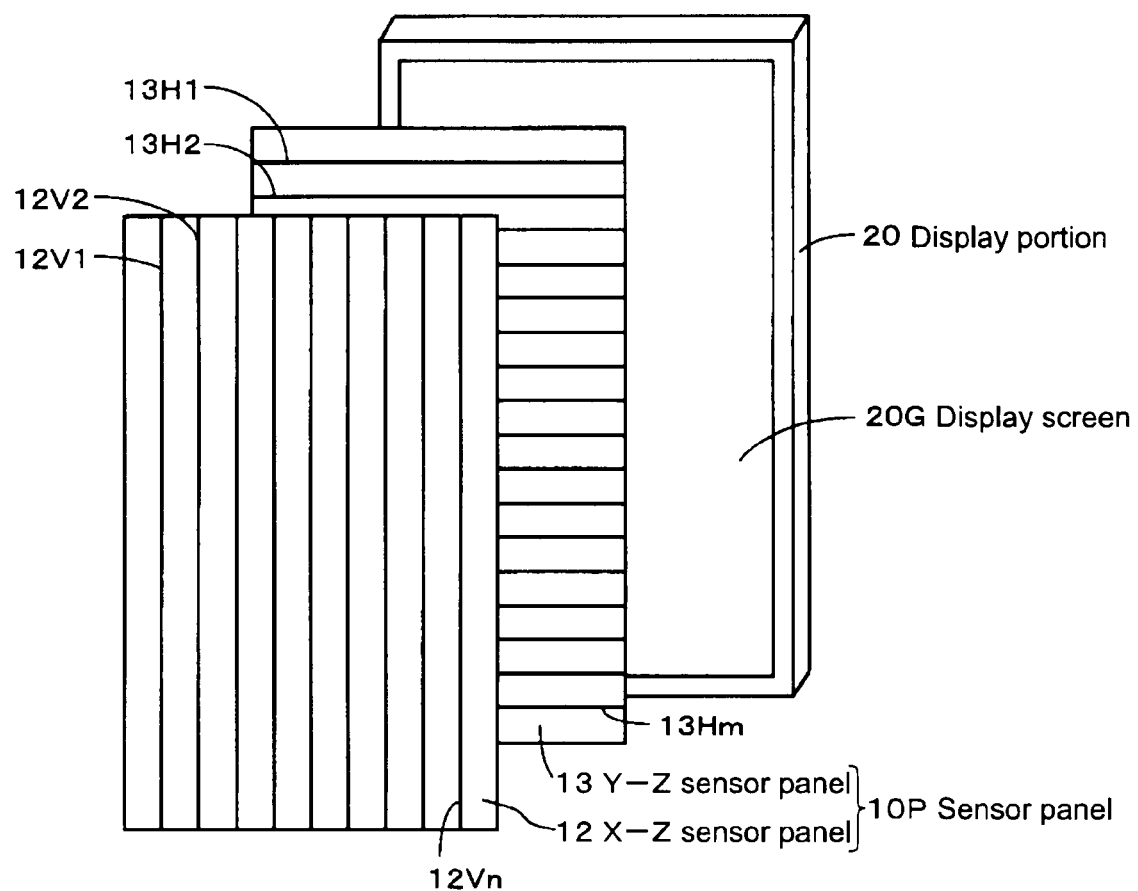
FIG. 2 is a diagram for explaining a structure of a sensor portion of this embodiment.

FIG. 2 is a diagram for explaining a structure of the sensor portion 10 of this embodiment. In this embodiment, as shown in FIGS. 1 and 2, a multilayer structure in which the sensor portion 10 is superimposed on a front surface of the display portion 20 is adopted.

Specifically, as shown in FIG. 2, an X-Z sensor panel 12, a Y-Z sensor panel 13, and the display portion 20 are arranged in the stated order from a front side to a rear side in an operational direction of the sensor portion 10.

The X-Z sensor panel 12 and the Y-Z sensor panel 13 are principal components of the sensor portion 10 of this embodiment and constitute the sensor panel 10P. The X-Z sensor panel 12 and the Y-Z sensor panel 13 are constituted of a plurality of wire electrodes arranged in two orthogonal directions in this example.

In the X-Z sensor panel 12, a plurality of longitudinal electrodes 12V1, 12V2, 12V3, . . . , and 12Vn (n is an integer of 2 or more) having a drawing direction of the wire electrodes in the vertical direction (longitudinal direction) in FIG. 2 are arranged at regular intervals in the horizontal direction (lateral direction) in the example of FIG. 2.

Moreover, in the Y-Z sensor panel 13, a plurality of lateral electrodes 13H1, 13H2, 13H3, . . . , and 13Hm (m is an integer of 2 or more) having a drawing direction of the wire electrodes in the horizontal direction (lateral direction) in FIG. 2 are arranged at regular intervals in the vertical direction (longitudinal direction) in the example of FIG. 2.

FIGS. 3A and 3B are cross-sectional side views of the X-Z sensor panel 12 and the Y-Z sensor panel 13, respectively.

The X-Z sensor panel 12 has a structure in which an electrode layer 19V including the plurality of longitudinal electrodes 12V1, 12V2, 12V3, . . . , and 12Vn is interposed between two glass plates 17V and 18V.

Further, the Y-Z sensor panel 13 has a structure in which an electrode layer 19H including the plurality of lateral electrodes 13H1, 13H2, 13H3, . . . , and 13Hm is interposed between two glass plates 17H and 18H. It should be noted that 13Hi in FIG. 3B represents an i-th lateral electrode.

It should be noted that though not shown in FIG. 2, a circuit component to which electrode terminals of the X-Z sensor panel 12 and the Y-Z sensor panel 13 are connected and which detects a position designated by the user is also provided as will be described later.

The circuit component is a printed circuit board for the sensor portion 10 and provided at a predetermined position like below the display portion 20. As described above, the sensor portion 10 is constituted of the sensor panel 10P including the X-Z sensor panel 12 and the Y-Z sensor panel 13 and the printed circuit board for the sensor portion 10.

As shown in FIG. 2, although the sensor portion 10 includes the plurality of wire electrodes, since the wire electrodes are extremely thin, a video displayed on the display screen of the display portion 20 is not blocked by the sensor portion 10.

In other words, the user views a video displayed on the display screen of the display portion 20 via the sensor portion 10, but an inconvenience that viewability of a video displayed on the display screen is impaired or a displayed video is deteriorated does not occur.

(Circuit Structure of Sensor Portion 10)

As in Patent Document 1, in this embodiment, a capacitance corresponding to a distance between the X-Z sensor panel 12 and the Y-Z sensor panel 13 of the sensor portion 10 and the detection target object is converted into an oscillating frequency of an oscillation circuit to be detected. In addition, in this embodiment, the sensor portion 10 counts a pulse number of a pulse signal corresponding to the oscillating frequency and uses the count value corresponding to the oscillating frequency as a sensor output signal.

Figure 4:
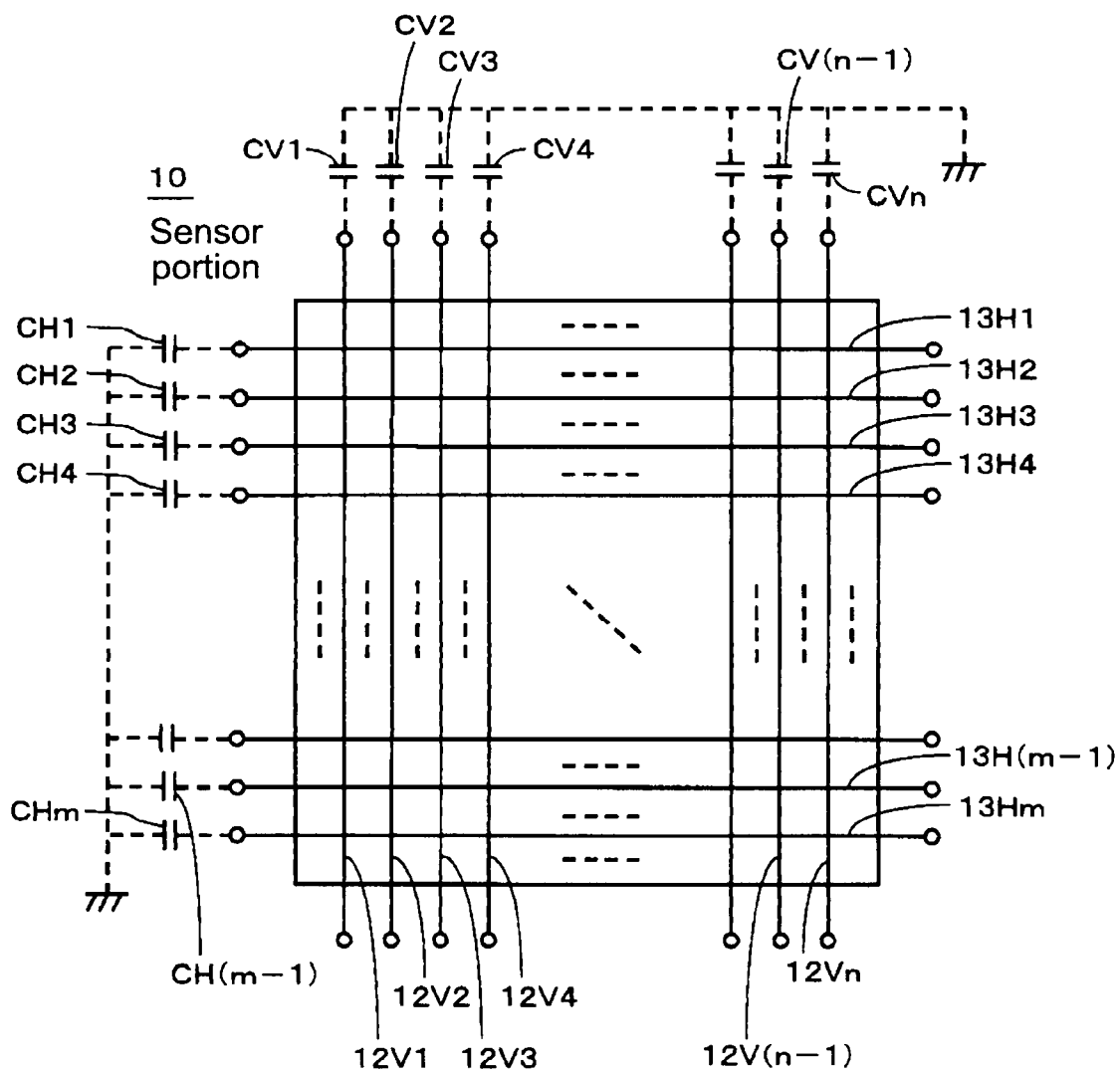
FIG. 4 is a diagram for explaining a structural example of the sensor portion of this embodiment.
Figure 5:
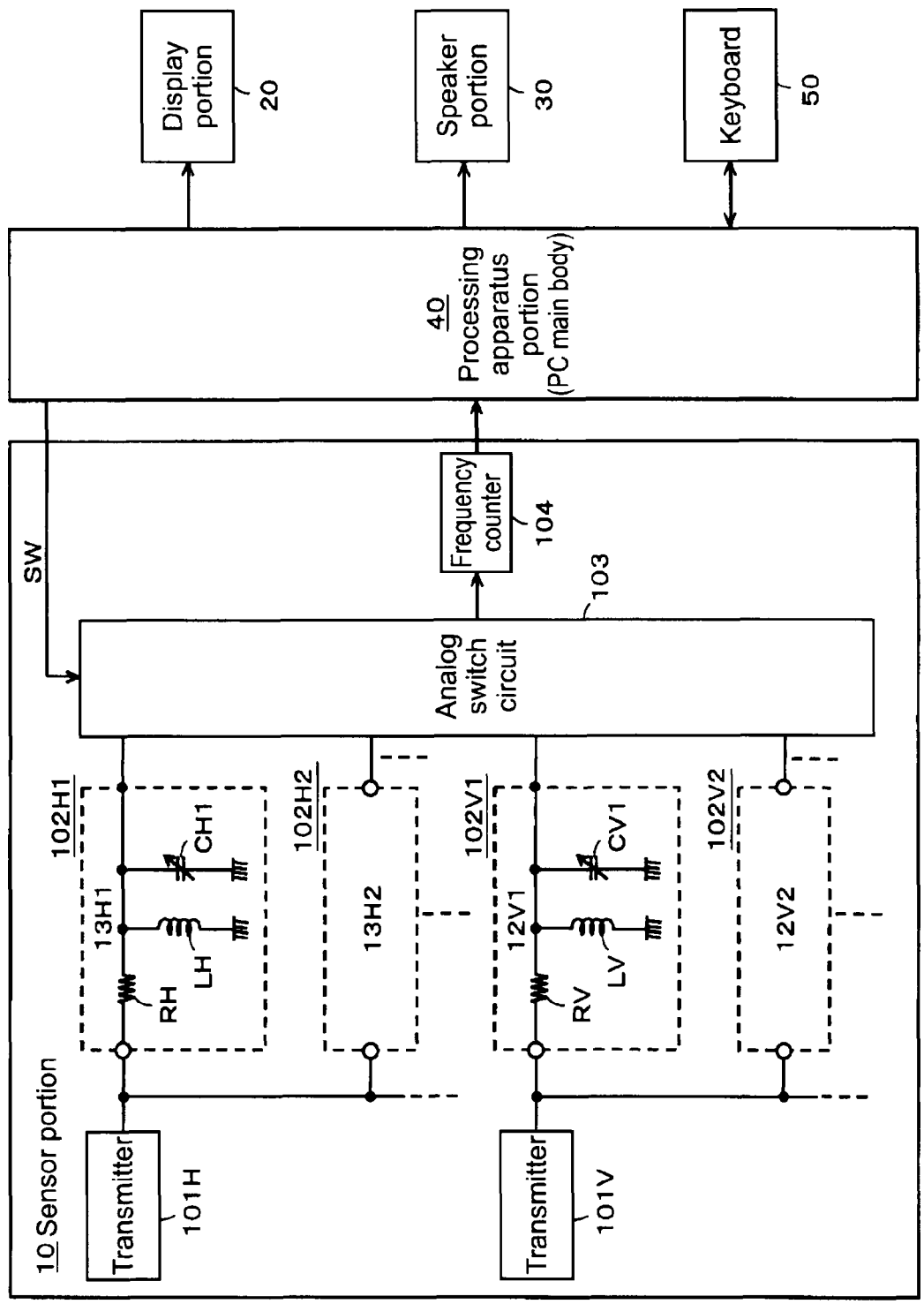
FIG. 5 is a block diagram for explaining a structural example of mainly a part of the sensor portion of this embodiment.

FIG. 4 is a diagram for explaining the sensor portion 10 in which the X-Z sensor panel 12 and the Y-Z sensor panel 13 are laminated. Moreover, FIG. 5 shows an example of a circuit structure for generating a sensor detection output signal to be output from the sensor portion 10.

As shown in FIG. 4, the plurality of wire electrodes are arranged in two orthogonal directions in the sensor portion 10 of this embodiment as described above. In other words, the plurality of longitudinal electrodes 12V1, 12V2, 12V3, . . . , and 12Vn and the plurality of lateral electrodes 13H1, 13H2, 13H3, . . . , and 13Hm are arranged in mutually-orthogonal directions.

In this case, capacitances (floating capacitances) $CH_1$, $CH_2$, $CH_3$, . . . , $CH_m$ exist between the plurality of lateral electrodes 13H1, 13H2, 13H3, . . . , and 13Hm and the ground. In addition, the capacitances $CH_1$, $CH_2$, $CH_3$, . . . , and $CH_m$ vary depending on a spatial position of a hand or finger on the Y-Z sensor panel 13.

Both end portions of the plurality of lateral electrodes 13H1, 13H2, 13H3, . . . , and 13Hm are lateral electrode terminals. In this example, one of the lateral electrode terminals of each of the plurality of lateral electrodes 13H1, 13H2, 13H3, . . . , and 13Hm is connected to a transmitter 101H for lateral electrodes shown in FIG. 5.

Moreover, the other one of the lateral electrode terminals of each of the plurality of lateral electrodes 13H1, 13H2, 13H3, . . . , and 13Hm is connected to an analog switch circuit 103. It should be noted that as described above, the circuit components shown in FIG. 5 are provided at predetermined positions like below the display portion 20.

In this case, the lateral electrodes 13H1, 13H2, 13H3, . . . , and 13Hm can be expressed by an equivalence circuit as shown in FIG. 5. In FIG. 5, an equivalence circuit for the lateral electrode 13H1 is shown. However, the same holds true for the other lateral electrodes 13H2, . . . , and 13Hm.

Specifically, the equivalence circuit of the lateral electrode 13H1 is constituted of a resistor RH, an inductance LH, and the capacitance CH1 as the detection target. The capacitance changes to CH2, CH3, . . . , and CHm for the other lateral electrodes 13H2, 13H3, . . . , and 13Hm, respectively.

The equivalence circuits of the lateral electrodes 13H1, 13H2, 13H3, . . . , and 13Hm constitute a resonance circuit and also constitute an oscillation circuit together with the transmitter 101H. The lateral electrodes 13H1, 13H2, 13H3, . . . , and 13Hm also constitute lateral electrode capacitance detection circuits 102H1, 102H2, 102H3, . . . , and 102Hm, respectively. Further, outputs of the lateral electrode capacitance detection circuits 102H1, 102H2, 102H3, . . . , and 102Hm are signals of oscillating frequencies respectively corresponding to the capacitances CH1, CH2, CH3, . . . , and CHm that correspond to the distances of the detection target object from the sensor panel surface.

When the user moves his/her hand or fingertip close to or away from the Y-Z sensor panel 13 on the Y-Z sensor panel 13, values of the capacitances CH1, CH2, CH3, . . . , and CHm change. Thus, in the lateral electrode capacitance detection circuits 102H1, 102H2, 102H3, . . . , and 102Hm, a positional change of the hand or fingertip is detected as a change in the oscillating frequency of the oscillation circuit.

On the other hand, both end portions of the plurality of longitudinal electrodes 12V1, 12V2, 12V3, . . . , and 12Vn are longitudinal electrode terminals.

In this example, one of the longitudinal electrode terminals of each of the plurality of longitudinal electrodes 12V1, 12V2, 12V3, . . . , and 12Vn is connected to a transmitter 101V for longitudinal electrodes. In this example, a basic frequency of an output signal of the transmitter 101V for longitudinal electrodes is different from a frequency of the transmitter 101H for lateral electrodes.

Moreover, the other one of the longitudinal electrode terminals of each of the plurality of longitudinal electrodes 12V1, 12V2, 12V3, . . . , and 12Vn is connected to the analog switch circuit 103.

In this case, the longitudinal electrodes 12V1, 12V2, 12V3, . . . , and 12Vn can also be expressed by an equivalence circuit as shown in FIG. 5 as in the case of the lateral electrodes. In FIG. 5, an equivalence circuit for the longitudinal electrode 12V1 is shown. However, the same holds true for the other longitudinal electrodes 12V2, . . . , and 12Vn.

Specifically, the equivalence circuit of the longitudinal electrode 12V1 is constituted of a resistor RV, an inductance LV, and the capacitance CV1 as the detection target. The capacitance changes to CV2, CV3, . . . , and CVn for the other longitudinal electrodes 12V2, 12V3, . . . , and 12Vn, respectively.

The equivalence circuits of the longitudinal electrodes 12V1, 12V2, 12V3, . . . , and 12Vn constitute a resonance circuit and also constitute an oscillation circuit together with the transmitter 101V. The longitudinal electrodes 12V1, 12V2, 12V3, . . . , and 12Vn also constitute longitudinal electrode capacitance detection circuits 102V1, 102V2, 102V3, . . . , and 102Vn, respectively. Further, outputs of the longitudinal electrode capacitance detection circuits 102V1, 102V2, 102V3, . . . , and 102Vn are signals of oscillating frequencies respectively corresponding to the capacitances CV1, CV2, CV3, . . . , and CVn that correspond to the distances of the detection target object from the X-Z sensor panel 12.

Also in the longitudinal electrode capacitance detection circuits 102V1, 102V2, 102V3, . . . , and 102Vn, changes in values of the capacitances CV1, CV2, CV3, . . . , and CVn that correspond to positional changes of the hand or fingertip are detected as changes in the oscillating frequency of the oscillation circuit.

Further, the outputs of the lateral electrode capacitance detection circuits 102H1, 102H2, 102H3, . . . , and 102Hm and the outputs of the longitudinal electrode capacitance detection circuits 102V1, 102V2, 102V3, . . . , and 102Vn are supplied to the analog switch circuit 103.

By a switch signal SW from the processing apparatus portion 40, the analog switch circuit 103 selects and outputs successively, at a predetermined velocity, any one of the outputs of the lateral electrode capacitance detection circuits 102H1 to 102Hm and the longitudinal electrode capacitance detection circuits 102V1 to 102Vn.

Then, the output from the analog switch circuit 103 is supplied to a frequency counter 104. The frequency counter 104 counts an oscillating frequency of a signal input thereto. Specifically, an input signal of the frequency counter 104 is a pulse signal corresponding to the oscillating frequency, and as a result of counting the pulse number of the pulse signal within a predetermined time range, the count value corresponds to the oscillating frequency.

An output count value of the frequency counter 104 is supplied to the processing apparatus portion 40 as a sensor output for the wire electrode selected by the analog switch circuit 103. The output count value of the frequency counter 104 is obtained in sync with the switch signal SW supplied to the analog switch circuit 103 from the processing apparatus portion 40.

Therefore, the processing apparatus portion 40 judges, based on the switch signal SW supplied to the analog switch circuit 103, for which wire electrode the output count value of the frequency counter 104 has been output as the sensor output. Then, the processing apparatus portion 40 stores in its own buffer portion the wire electrode and the output count value in association with each other.

After that, the processing apparatus portion 40 detects a spatial position of the detection target object (distance from sensor portion 10 and x, y coordinates on sensor portion 10) from the sensor outputs of the detection target object for all the wire electrodes that are stored in the buffer portion.

As described in Patent Document 1, in actuality, the sensor outputs of the plurality of lateral electrode capacitance detection circuits 102H1 to 102Hm and the plurality of longitudinal electrode capacitance detection circuits 102V1 to 102Vn are obtained in accordance with the x, y coordinate position of the detection target object on the sensor panel 10P of the sensor portion 10.

Since the distance between the x, y coordinate position on the sensor panel 10P at which the detection target object is present and the sensor panel 10P is the shortest, the sensor outputs from the lateral electrode capacitance detection circuit and the longitudinal electrode capacitance detection circuit that detect capacitances between two electrodes corresponding to that position out of the plurality of sensor outputs become prominent as compared to the other sensor outputs.

From the descriptions above, the processing apparatus portion 40 obtains, from the plurality of sensor outputs from the sensor portion 10, the x, y coordinates at which the detection target object is located on the sensor panel 10P and the distance (z coordinate) from the sensor panel 10P to the detection target object. In other words, it is judged that the detection target object such as a hand is in the space above the detected x, y coordinates.

It should be noted that since the detection target object is of a predetermined size, the detection target object is detected as being apart a distance corresponding to the capacitance within a range of the x, y coordinate position on the sensor panels 12 and 13 that corresponds to the size of the detection target object.

Also in this embodiment, a thinning-out switch of the wire electrodes for detecting the capacitance is performed as in Patent Document 1 in accordance with the distance between the spatial position of the detection target object and the sensor panels 12 and 13.

The thinning-out switch of the wire electrodes is carried out by controlling, by the switch signal SW from the processing apparatus portion 40, once every how many wire electrodes (including 0) the wire electrode is to be selected in the analog switch circuit 103. A switch timing is determined in advance in accordance with the distance from the sensor panels 12 and 13 to the detection target object. For example, a layer change point to be described later may be used as the switch timing.

It should be noted that in the descriptions above, the transmitters have been used separately for the lateral electrodes and the longitudinal electrodes. However, to simplify the structure, a single transmitter may be used in common. Moreover, ideally, it is better to provide a plurality of transmitters having frequencies that differ for each of the wire electrodes.

The processing apparatus portion 40 is capable of determining how to reproduce audio information or video information to be reproduced based on the sensor outputs from the sensor portion 10 and reproducing the information in accordance therewith.

(Example of Processing Operation Using Sensor Output from Sensor Portion 10)

Figure 6:
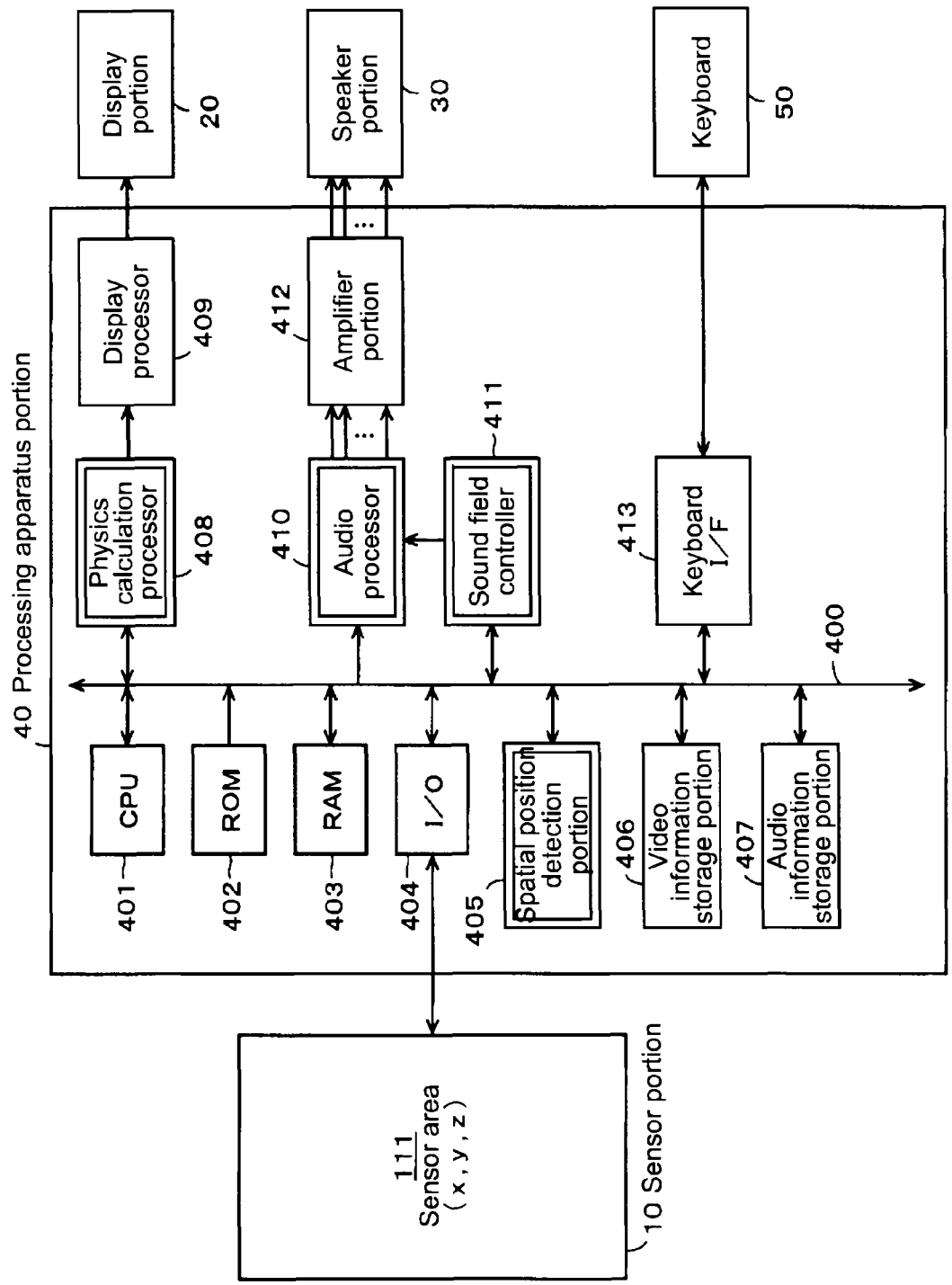
FIG. 6 is a block diagram for explaining a structural example of the information processing apparatus of this embodiment.

FIG. 6 is a block diagram for explaining a structure of the processing apparatus portion 40 that receives the sensor outputs from the sensor portion 10 described with reference to FIGS. 2 to 5 and a processing operation thereof.

As shown in FIG. 6, in the processing apparatus portion 40, a program ROM (Read Only Memory) 402 and a work area RAM (Random Access Memory) 403 are connected to a CPU (Central Processing Unit) 401 via a system bus 400.

In this embodiment, connected to the system bus 400 are an I/O port (Input/Output) 404, a spatial position detection portion 405, a video information storage portion 406, and an audio information storage portion 407. Furthermore, also connected to the system bus 400 are a physics calculation processor 408 for video information, an audio processor 410, a sound field controller 411, and a keyboard interface (hereinafter, abbreviated to keyboard I/F) 413.

Moreover, a display processor 409 is connected to the physics calculation processor 408, and an amplifier portion (audio amplifier portion) 412 is connected to the audio processor 410.

As shown in FIG. 6, to the processing apparatus portion 40, the sensor portion 10 is connected via the I/O port 404, and the display portion 20 is connected via the physics calculation processor 408 and the display processor 409.

Further, also to the processing apparatus portion 40, the speaker portion 30 is connected via the audio processor 410 and the amplifier portion 412, and the keyboard 50 is connected via the keyboard I/F 413.

It should be noted that the spatial position detection portion 405, the physics calculation processor 408, the audio processor 410, and the sound field controller 411 indicated by double lines in FIG. 6 are functional portions that the CPU 401 is capable of realizing as software processing in accordance with a program stored in the ROM 402.

As described above, the sensor portion 10 has, in front of the sensor panel 10P thereof, a sensor area 111 in a three-dimensional coordinate space expressed by the lateral direction (x-axis direction) and the longitudinal direction (y-axis direction) on the surface of the sensor panel 10P and the direction orthogonal to the surface of the sensor panel 10P (z-axis direction).

The processing apparatus portion 40 is capable of receiving, via the I/O port 404, a sensor output signal corresponding to a position of the detection target object such as a hand of a user in the sensor area 111 of the sensor portion 10.

The spatial position detection portion 405 receives the sensor output signal (detection output) supplied from the sensor portion 10 and detects a position designated by a hand or the like of the user in the sensor area 111 as the three-dimensional coordinate space (three-dimensional coordinates) as described above.

The spatial position detection portion 405 has a function as a judgment means for judging, based on the detected result, to which of a plurality of areas set in the sensor area 111 the position designated by the hand or the like of the user belongs.

The video information storage portion 406 stores video information to be reproduced. The video information stored in the video information storage portion 406 is read out under control of the CPU 401, processed by the physics calculation processor 408 and the display processor 409 as will be described later, and supplied to the display portion 20. It should be noted that the video information to be reproduced that is stored in the video information storage portion 406 includes both types of information used for reproducing moving images and information used for reproducing still images.

The physics calculation processor 408 for video information is controlled by the CPU 401 and imparts a predetermined effect to the video information supplied thereto in accordance with a physics model selected in advance from various physics models including, for example, rings (watering), sound vibration, and snow crystals.

Specifically, although details will be given later, the physics calculation processor 408 imparts an effect according to the physics model to a reproduction video corresponding to the video information to be reproduced in accordance with the designated position in the three-dimensional coordinate space designated by the detection target object such as a hand of a user.

The display processor 409 generates a video signal in a format that can be supplied to the display portion 20 based on the video information from the physics calculation processor 408 and supplies the signal to the display portion 20. Accordingly, a video corresponding to the video signal processed and generated by the physics calculation processor 408 and the display processor 409 is displayed on the display screen of the display portion 20.

It should be noted that, as will be described later, the physics calculation processor 408 does not constantly impart an effect to the video information in accordance with the physics model, but imparts an effect in accordance with the physics model based on an operational input from the user received via the sensor portion 10, for example.

The audio information storage portion 407 stores audio information to be reproduced, such as music data. The audio information stored in the audio information storage portion 407 is read out under control of the CPU 401, processed by the audio processor 410 and the amplifier portion 412 as will be described later, and supplied to the speaker portion 30.

It should be noted that as described above, the speaker portion 30 is an array speaker, and the audio processor 410 and the amplifier portion 412 include speaker channels in numbers corresponding to the number of speakers included in the speaker portion 30.

The audio processor 410 includes a switch circuit and a mix circuit and carries out processing of selecting (switching) a speaker to output audio and mixing audio signals of a plurality of audio channels under control of the CPU 401.

Here, the switch circuit selects (switches) a speaker (speaker channel) to output audio. Moreover, the mix circuit is supplied with audio information of multiple channels and mixes the audio information of the target audio channels out of the supplied pieces of audio information.

Furthermore, the audio processor 410 includes a digital filter (digital signal processing circuit) corresponding to each speaker channel. The digital filter is controlled by the sound field controller 411 and performs digital signal processing on the audio information to be supplied to each of the speakers of the speaker portion 30 constituting the array speaker.

Moreover, the sound field controller 411 controls each of the plurality of digital filters that the audio processor 410 includes for the respective speaker channels as described above so that an appropriate sound field can be formed under control of the CPU 401.

Accordingly, it is possible to form a virtual sound source (virtual speaker) at a desired position by audio emitted from the speaker of the speaker portion 30 and listen to the audio as if it is being emitted from the virtual sound source.

The virtual sound source (virtual speaker) used herein refers to a position (place) where the user feels the audio is being emitted from even when no sound source (speaker) is provided in actuality.

It should be noted that the digital signal processing carried out by the audio processor 410 enables the virtual sound source to be formed by using a wavefront synthesis technique, for example. The wavefront synthesis technique will be described later in detail.

Further, the keyboard I/F 413 is capable of converting an instruction input from the user received via the keyboard 50 into a signal in a format processable by the CPU 401 and supplying it to the CPU 401 or the like via the system bus 400.

EXAMPLE 1 OF AUDIO OUTPUT PROCESSING

Claims 1, 8, and 9

In the information processing apparatus of this embodiment structured as described above, the spatial position detection portion 405 of the processing apparatus portion 40 judges, based on three-dimensional coordinates as a detection output from the sensor portion 10, an area including the three-dimensional coordinates.

The spatial position detection portion 405 is capable of judging an area that includes the detected three-dimensional coordinates. However, in Example 1 of the audio output processing, based on the judgment result of the spatial position detection portion 405, the CPU 401 controls the audio processor 410 to output audio corresponding to audio information from a position corresponding to two-dimensional coordinates out of the detected three-dimensional coordinates.

As described above, in Example 1 of the audio output processing, audio corresponding to predetermined audio information is output from a position corresponding to at least the two-dimensional coordinates out of the three-dimensional coordinates designated by the detection target object such as a hand of a user, that have been detected via the sensor portion 10.

Figure 7:
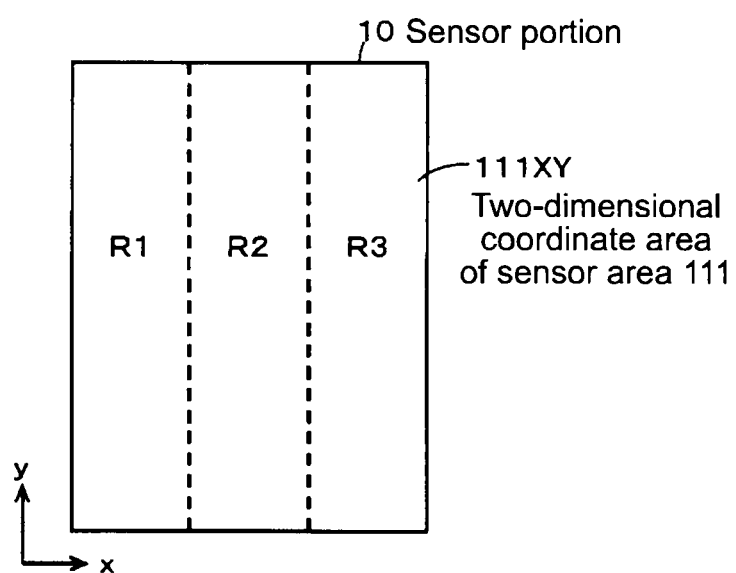
FIG. 7 is a diagram for explaining a two-dimensional coordinate area of a sensor area formed by the sensor portion of this embodiment.

FIGS. 7 and 8 are diagrams for explaining Example 1 of the audio output processing for outputting audio corresponding to audio information to be reproduced from a position corresponding to at least two-dimensional coordinates (x, y coordinates) out of the three-dimensional coordinates detected by the sensor portion 10.

As described above, the sensor portion 10 is capable of detecting the three-dimensional coordinates corresponding to the position of the detection target object such as a hand of a user in the three-dimensional coordinate space in which the lateral and longitudinal directions on the sensor panel surface are the x- and y-axis directions, respectively, and the direction orthogonal to the sensor panel surface is the z-axis direction.

Thus, the spatial position detection portion 405 of the processing apparatus portion 40 can detect in which area within the sensor area 111 as the three-dimensional coordinate space formed by the sensor portion 10 the detection target object is positioned, based on the three-dimensional coordinates from the sensor portion 10.

In this example, however, the CPU 401 of the processing apparatus portion 40 specifies the position of the detection target object within the two-dimensional coordinate space based on the judgment result of the spatial position detection portion 405 as described above and selectively uses the speakers of the speaker portion 30 in accordance with the specified position.

In other words, instead of the distance between the detection target object such as a hand of a user and the sensor panel surface, a two-dimensional coordinate area 111XY in the lateral direction (x-axis direction) and the longitudinal direction (y-axis direction) as shown in FIG. 7 in the sensor area 111 formed by the sensor portion 10 is taken into account.

In this example, the two-dimensional coordinate area 111XY is trisected in the lateral direction (horizontal direction) to thus set areas R1, R2, and R3 as shown in FIG. 7.

Based on the judgment result of the spatial position detection portion 405, the CPU 401 controls the audio processor 410 in accordance with in which area on the two-dimensional coordinate area 111XY the area that the detection target object belongs is, and switches the speaker to supply audio information.

It should be noted that in Example 1, stereo audio information of two channels stored in the audio information storage portion 407 is read out by the CPU 401 and constantly supplied to the audio processor 410.

Then, as described below, the speaker to output the audio information is switched in accordance with the position designated by the detection target object such as a hand of a user within the two-dimensional coordinate area 111XY.

Figure 8A:
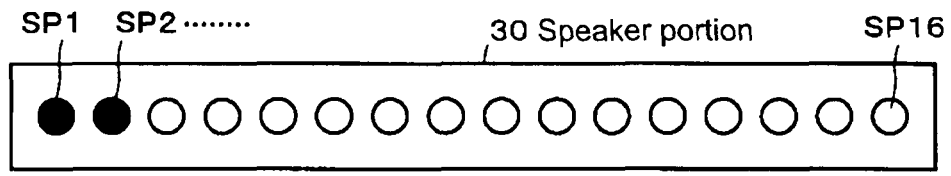
FIG. 8 are diagrams for explaining Example 1 of audio output processing for outputting audio corresponding to audio information from a position corresponding to two-dimensional coordinates.

Specifically, assuming that the spatial position detection portion 405 has judged that the detection target object such as a hand of a user is in the area R1 of the two-dimensional coordinate area 111XY, the spatial position detection portion 405 controls the audio processor 410 via the CPU 401, for example, and supplies audio information of a left-hand (L) channel to only the speakers SP1 and SP2 provided at the left end portion of the speaker portion 30 as shown in FIG. 8A.

Figure 8B:
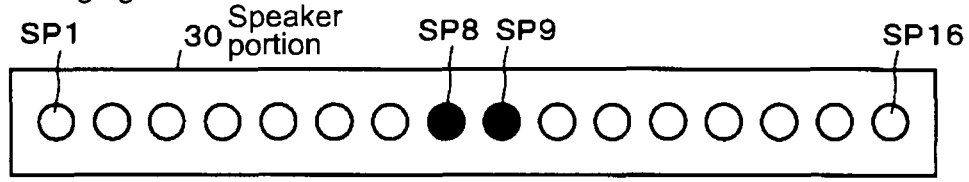

Moreover, assuming that the spatial position detection portion 405 has judged that the detection target object such as a hand of a user is in the area R2 of the two-dimensional coordinate area 111XY, the spatial position detection portion 405 controls the audio processor 410 via the CPU 401, for example, and supplies audio information to only the speakers SP8 and SP9 provided at the center portion of the speaker portion 30 as shown in FIG. 8B. In this case, audio information of the left-hand (L) channel is supplied to the speaker SP8, whereas audio information of a right-hand (R) channel is supplied to the speaker SP9.

Figure 8C:
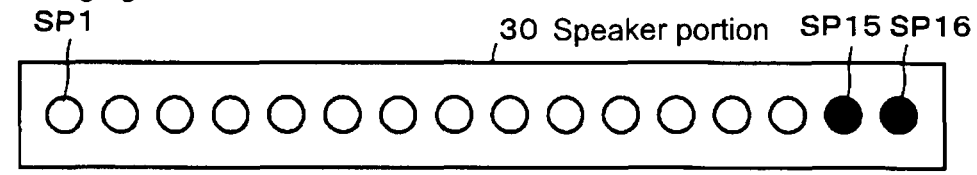

Moreover, assuming that the spatial position detection portion 405 has detected that the detection target object such as a hand of a user is in the area R3 of the two-dimensional coordinate area 111XY, the spatial position detection portion 405 controls the audio processor 410 via the CPU 401, for example, and supplies audio information of the right-hand (R) channel to only the speakers SP15 and SP16 provided at the right end portion of the speaker portion 30 as shown in FIG. 8C.

Accordingly, at a time the detection target object such as a hand is brought close to the area R1 on the left-hand side of the sensor panel 10P of the sensor portion 10, audio can be emitted from only the speakers SP1 and SP2 provided on the left-hand side of the speaker portion 30.

Similarly, at a time the detection target object such as a hand is brought close to the area R2 provided at the center portion of the sensor panel 10P of the sensor portion 10, audio can be emitted from only the speakers SP8 and SP9 provided at the center of the speaker portion 30.

Similarly, at a time the detection target object such as a hand is brought close to the area R3 on the right-hand side of the sensor panel 10P of the sensor portion 10, audio can be emitted from only the speakers SP15 and SP16 provided on the right-hand side of the speaker portion 30.

As described above, it is possible to control the position to emit audio corresponding to audio information to be reproduced in accordance with the two-dimensional coordinates out of the three-dimensional coordinates from the sensor portion 10.

(Summary of Operation of Example 1 of Audio Output Processing)

Figure 9:
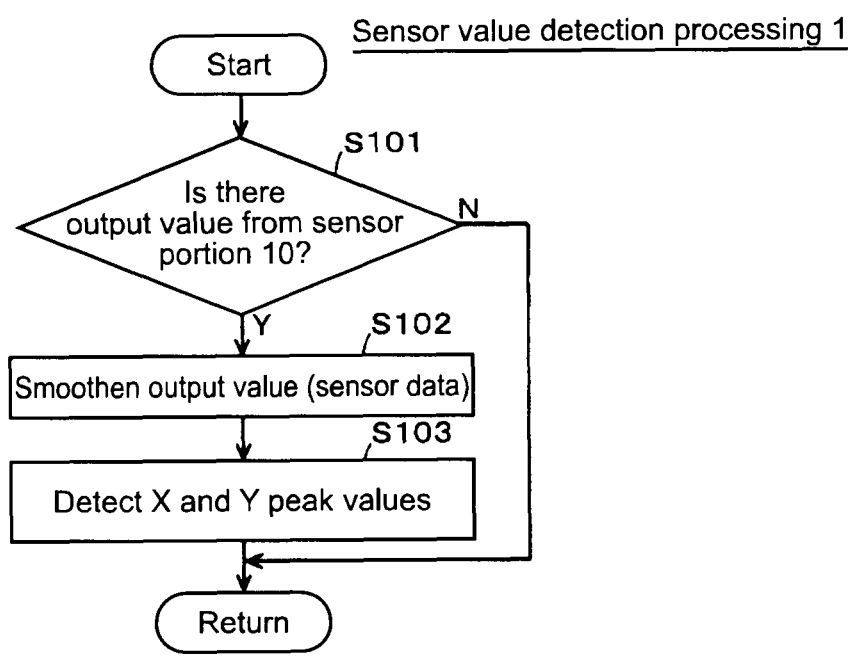
FIG. 9 is a flowchart for explaining sensor value detection processing.
Figure 10:
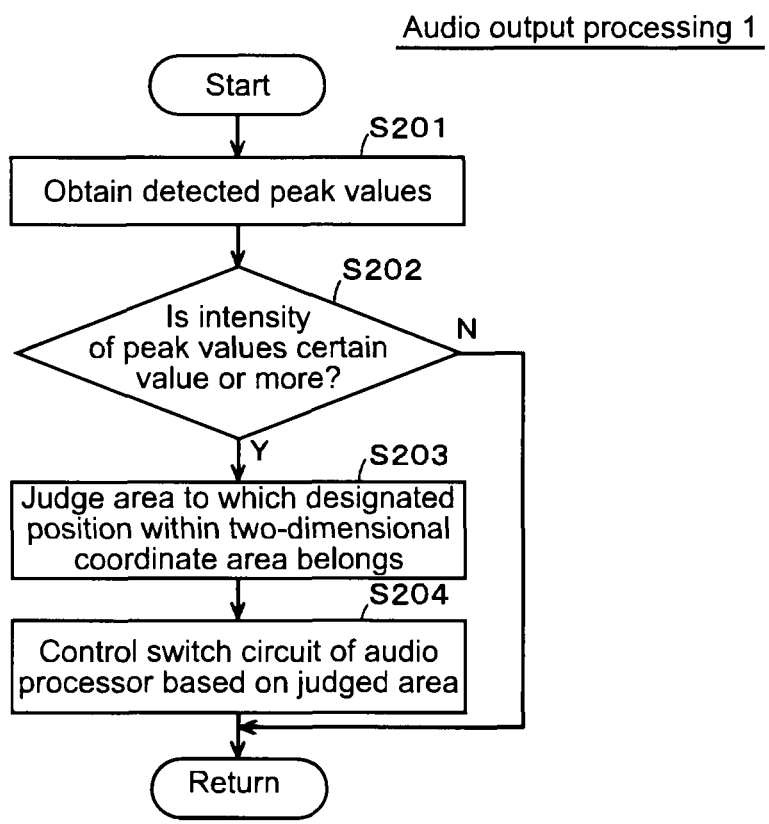
FIG. 10 is a flowchart for explaining audio output processing.

Next, Example 1 of the audio output processing will be summarized using the flowcharts of FIGS. 9 and 10. FIG. 9 is a flowchart for explaining sensor value detection processing 1 that is carried out by the spatial position detection portion 405 of the processing apparatus portion 40. Moreover, FIG. 10 is a flowchart for explaining audio output processing 1 that mainly the spatial position detection portion 405 and the audio processor 410 of the processing apparatus portion 40 carry out in cooperation with each other.

The processing shown in FIG. 9 is repeated at predetermined intervals and executed mainly by the spatial position detection portion 405. First, the spatial position detection portion 405 judges whether an output value (sensor data) from the sensor portion 10 has been received via the I/O port 404 (Step S101).

The judgment process of Step S101 is a process of judging whether the detection target object such as a hand of a user has been moved with respect to the sensor panel surface of the sensor portion 10. More specifically, the judgment process is a process of judging whether a detection output from the sensor portion 10 received via the I/O port 404 has been stored in the ROM 402 as described above.

When judged in the judgment process of Step S101 that there is no output value from the sensor portion 10, the processing shown in FIG. 9 is ended to wait for the next execution timing. When judged in the judgment process of Step S101 that there is an output value from the sensor portion 10, the spatial position detection portion 405 carries out a process of smoothening the output value from the sensor portion 10 received by the processing apparatus portion 40 (Step S102).

The process of Step S102 is a process of calculating a mean value of a plurality of detection values (plurality of samples) from the sensor portion 10 for improving an accuracy of a detection value.

Then, the spatial position detection portion 405 detects peak values of the values in the x-axis direction and the values in the y-axis direction in the two-dimensional coordinate area (Step S103). Specifically, since the output value from the sensor portion 10 is an integration value in the longitudinal and lateral directions as described above, a point at which the value becomes maximum is used as the detection value (coordinate value). Then, the processing shown in FIG. 9 is ended to wait for the next execution timing.

As described above, the spatial position detection portion 405 detects, based on the detection output from the sensor portion 10, a position (coordinates) designated by the detection target object such as a hand of a user in the two-dimensional coordinate area.

Information indicating the detected position (coordinates) within the two-dimensional coordinate area (peak values) is temporarily stored in a register inside the spatial position detection portion 405, the RAM 403, or the like.

Next, the spatial position detection portion 405 executes the audio output processing 1 shown in FIG. 10. First, the spatial position detection portion 405 obtains the peak values detected in the processing shown in FIG. 9 (information indicating position (coordinates) in two-dimensional coordinate area) (Step S201).

Then, the spatial position detection portion 405 judges whether an intensity of the obtained peak values is a certain value or more (Step S202). The process of Step S202 is a process for preventing a situation in which even a case where a hand of the user is accidentally brought close to the sensor panel surface of the sensor portion 10 is targeted for the processing, for example. In other words, the process is for detecting a case where the user has intentionally moved the detection target object such as a hand close to the sensor panel surface of the sensor portion 10.

When judged in the judgment process of Step S202 that the intensity of the obtained peak values is smaller than a certain value, the spatial position detection portion 405 ends the processing shown in FIG. 10. In other words, in this case, audio is not output.

When judged in the judgment process of Step S202 that the intensity of the obtained peak values is a certain value or more, the spatial position detection portion 405 judges the setting area in the two-dimensional coordinate area to which the two-dimensional coordinates (designated position) indicated by the obtained peak values belong (Step S203). The judgment process of Step S203 is a process of judging to which of the areas R1 to R3 the two-dimensional coordinates indicated by the obtained peak values belong as described with reference to FIG. 7.

After that, the spatial position detection portion 405 controls the switch circuit and the like of the audio processor 410 based on the judgment result of Step S203 via the CPU 401, for example (Step S204). Accordingly, audio corresponding to audio information of a desired channel to be reproduced is emitted from a target speaker of the speaker portion 30.

Specifically, the audio processor 410 specifies a channel (left-hand (L) channel, right-hand (R) channel) of audio information to be output under control of the spatial position detection portion 405. Then, as described with reference to FIG. 8, the audio processor 410 specifies the speaker to emit audio and emits audio corresponding to the audio information of the specified audio channel from the target speaker under control of the spatial position detection portion 405.

Then, the processing shown in FIG. 10 is ended, and the spatial position detection portion 405 waits for the next execution timing of the processing shown in FIG. 10.

As described above, in the case of Example 1 of the audio output processing, to describe it briefly, it is possible to determine the position (speaker) to emit audio based on the position of the detection target object such as a hand of a user in the x-axis direction in the two-dimensional coordinate area 111XY.

It should be noted that in this example, although the two speakers on the left-hand side, the two speakers at the center, and the two speakers on the right-hand side of the speaker portion 30 constituting the array speaker have been used as described with reference to FIG. 8, the present invention is not limited thereto.

For example, four speakers on the left-hand side, four speakers at the center, and four speakers on the right-hand side of the speaker portion 30, that is, a total of 12 speakers may be used, or three speakers on the left-hand side, four speakers at the center, and three speakers on the right-hand side of the speaker portion 30, that is, a total of 10 speakers may be used instead.

Further, Example 1 above has been described assuming that audio information of two channels of left- and right-hand channels is reproduced. However, the present invention is not limited thereto, and the speakers to be supplied with the audio information only need to be switched also when reproducing monaural audio information.

Moreover, in a case of multichannel audio signals of quadraphonics, 5.1 channel, and the like, it is also possible to mix the audio signals on the same side to form audio signals of two left- and right-hand channels and output them as described with reference to FIG. 8.

Furthermore, in the case of multichannel audio signals of quadraphonics, 5.1 channel, and the like, it is also possible to supply audio information on the same side to different speakers without mixing them as described above.

For example, in the case of multichannel audio signals of a 5.1 channel, it is also possible to supply audio information of a forward left-hand channel to the speaker SP1 and supply audio information of a rearward left-hand channel to the speaker SP2. In this case, an audio signal of a subwoofer channel may be mixed with the audio information of the forward left-hand channel and the audio information of the rearward left-hand channel.

Moreover, in Example 1 above, the three areas R1 to R3 have been set in the horizontal direction in the two-dimensional coordinate area. However, the present invention is not limited thereto, and it is only necessary to set two or more areas in the horizontal direction and determine a speaker to be used and audio information to be used (audio information of which channel) for each of the set areas.

Further, the areas set in the two-dimensional coordinate area are not limited to the case where the areas are arranged in the horizontal direction as described with reference to FIG. 7. It is of course possible to set two or more areas in the vertical direction and determine a speaker to be used and audio information to be used (audio information of which channel) for each of the set areas.

In short, the position to emit audio corresponding to audio information to be reproduced only needs to be changed in accordance with the two-dimensional coordinates out of the three-dimensional coordinates from the sensor portion 10.

As can be seen from the descriptions above, the function of the sensor means is realized by the sensor portion 10. Moreover, the function of the judgment means is mainly realized by the spatial position detection portion 405. In addition, the function of the output means is mainly realized by the audio processor 410, the amplifier portion 412, and the speaker portion 30.

EXAMPLE 2 OF AUDIO OUTPUT PROCESSING

Claim 2

Next, Example 2 of the audio output processing capable of being carried out by the information processing apparatus of this embodiment will be described. In Example 2, audio corresponding to predetermined audio information is output from a position corresponding to three-dimensional coordinates designated by the detection target object detected by the sensor means.

In other words, while the position to emit audio has been controlled in accordance with the two-dimensional coordinates out of the three-dimensional coordinates detected by the sensor portion 10 in Example 1 above, in Example 2, the position to emit audio is controlled in accordance with the three-dimensional coordinates detected by the sensor portion 10.

(Plural Layers in Distance Direction (Z-Axis Direction))

Figure 11:
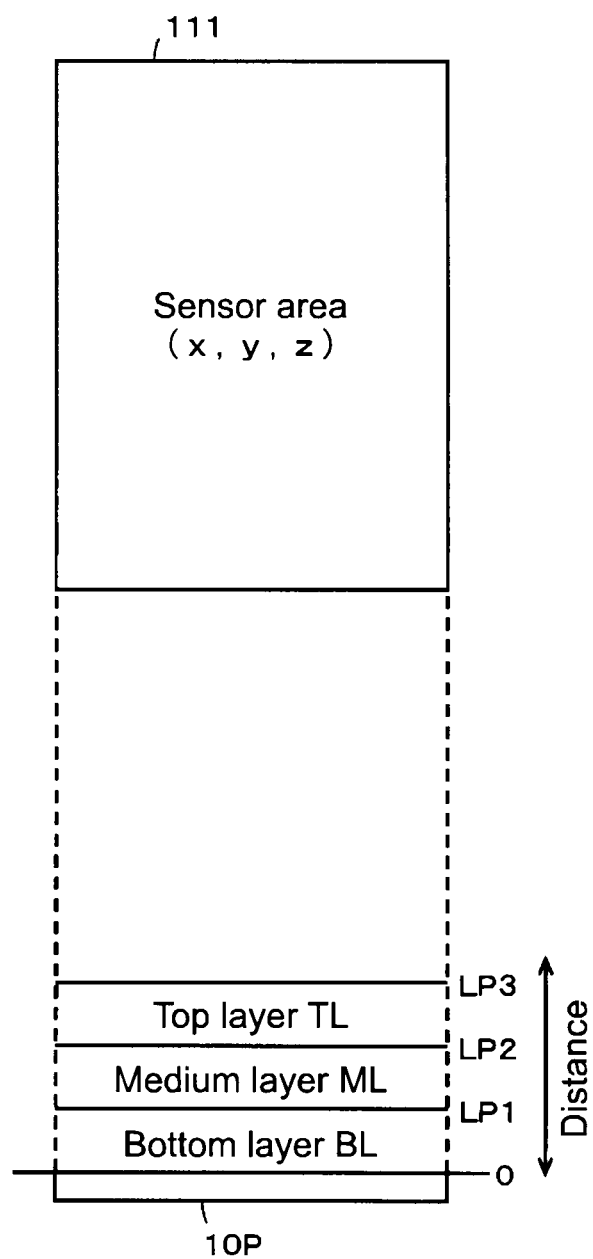
FIG. 11 is a diagram for explaining layers set on a sensor panel of the sensor portion.

FIG. 11 is a diagram for explaining layers set on the sensor panel 10P of the sensor portion 10 in this embodiment.

In this embodiment, a plurality of layers are set in the sensor area 111 as the three-dimensional coordinate space formed above the sensor panel 10P of the sensor portion 10, based on differences in the distance from the surface of the sensor panel 10P.

In the sensor area 111 in this embodiment, three layers of a bottom layer BL, a medium layer ML, and a top layer TL are set.

In this case, when a surface position of the sensor panel 10P of the sensor portion 10 is an origin 0 on the z axis as shown in FIG. 11, distances on the z axis as boundaries of the three layers BL, ML, and TL are set to LP1, LP2, and LP3, respectively.

Therefore, ranges of distances of the layers BL, ML, and TL are set to 0<bottom layer BL≤LP1, LP1<medium layer ML≤LP2, and LP2<top layer TL≤LP3.

Further, in this example, in the sensor area 111 formed on the sensor panel 10P of the sensor portion 10, the position of the virtual sound source can be changed depending on which layer the detection target object such as a hand of a user belongs to.

In addition, as described above, in the information processing apparatus of this embodiment, the virtual sound source is formed by using the wavefront synthesis technique. Herein, the wavefront synthesis technique will be described.

(Wavefront Synthesis Technique (Technique of Generating and Controlling Sound Field))

Here, the wavefront synthesis technique (technique of generating and controlling sound field) will be described. As a method of controlling a sound field in a three-dimensional space, there is, for example, a method shown in "*Study on 3D virtual reality based on Kirchhoff integration equation*" by Yoshio Yamazaki, Acoustic Laboratory, Research Institute for Science and Engineering, Waseda University. This method uses the following Kirchhoff integration formula.

Figure 12:
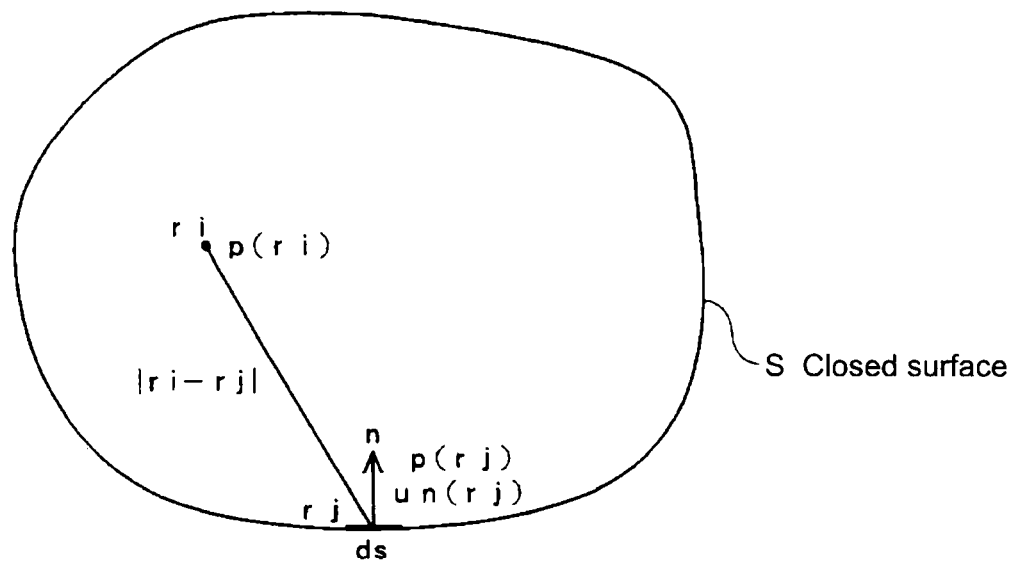
FIG. 12 is a diagram showing a sound field within a virtual closed surface not including a sound source.

Specifically, when assuming a closed surface S not including a sound source as shown in FIG. 12, a sound field of the closed surface S can be expressed by the Kirchhoff integration formula. In FIG. 12, p(ri) represents a sound pressure at a point ri in the closed surface S, p(rj) represents a sound pressure at a point rj on the closed surface S, n represents a normal line at the point rj, un(rj) represents a particle velocity in a direction of the normal line n, and |ri−rj| represents a distance between the points ri and rj.

The Kirchhoff integration formula is expressed by Equation (1) of FIG. 13, meaning that, if the sound pressure p(rj) on the closed surface S and the particle velocity un(rj) in the normal line n direction can be controlled completely, the sound field in the closed surface S can be fully reproduced.

It should be noted that ω in Equation (1) represents an angular frequency expressed by ω=2πf at a time an audio frequency is represented by f, ρ represents an air density, and Gij is expressed by Equation (2) of FIG. 13.

Equation (1) is for a steady sound field, but by controlling an instantaneous value of the sound pressure p(rj) and the particle velocity un(rj), the same can be said for a transient sound field.

As described above, in designing a sound field using the Kirchhoff integration formula, it is only necessary to reproduce the sound pressure p(rj) and the particle velocity un(rj) on the virtual closed surface S. However, in actuality, it is impossible to control the sound pressure p(rj) and the particle velocity un(rj) at all the consecutive points on the closed surface S. Therefore, under the presupposition that the sound pressure p(rj) and the particle velocity un(rj) are constant within a minute element of the closed surface S, the closed surface S is discretized.

When the closed surface S is discretized at N points, Equation (1) of FIG. 13 is expressed by Equation (3) of FIG. 13. By reproducing the sound pressure p(rj) and the particle velocity un(rj) at N points on the closed surface S, the sound field in the closed surface S can be fully reproduced.

Figure 14:
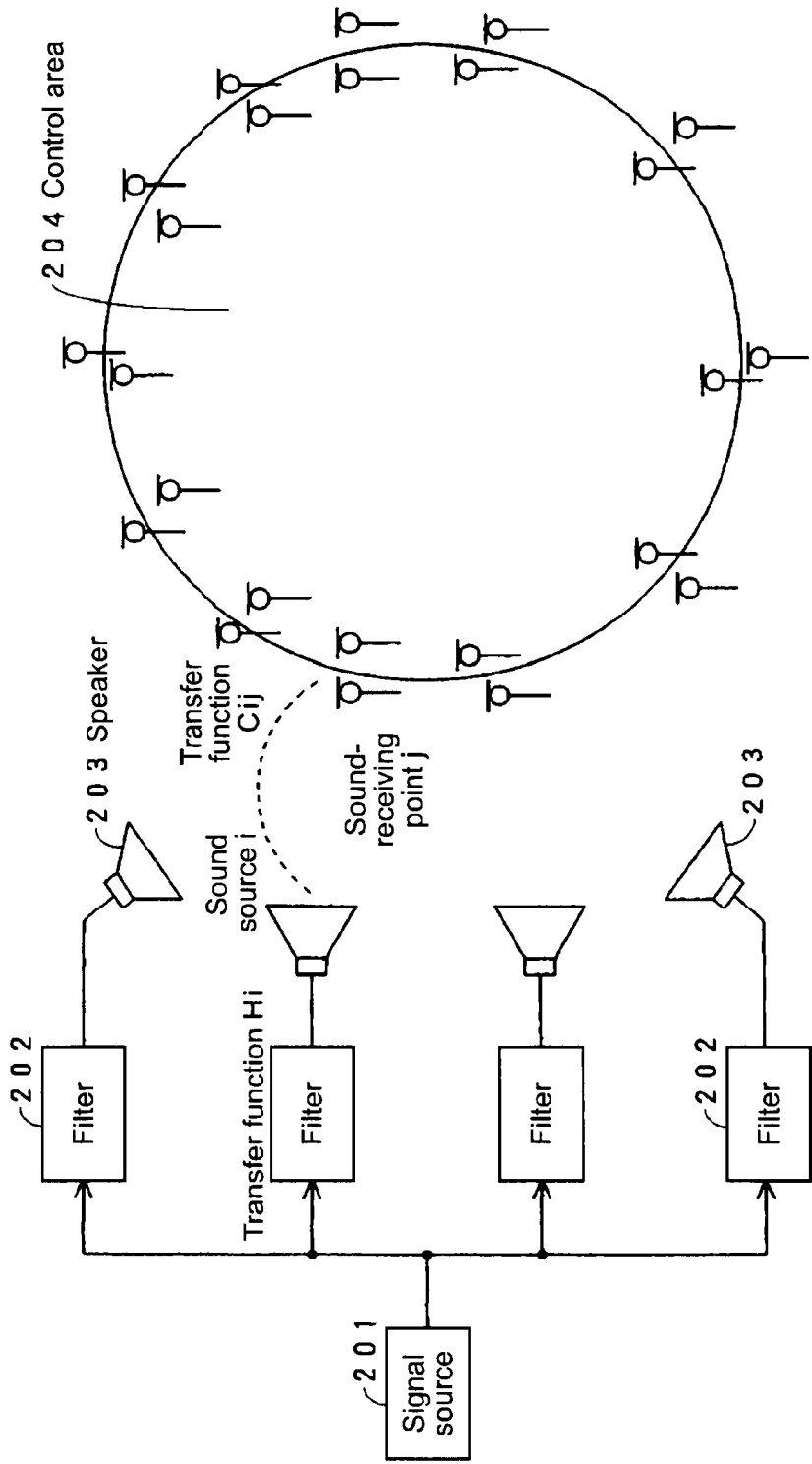
FIG. 14 is a diagram showing a system for reproducing N sound pressures and particle velocities using M sound sources.

As a system for reproducing the N sound pressures p(rj) and particle velocities un(rj) using M sound sources, there is a system as shown in FIG. 14.

In this system, audio signals from a signal source 201 are supplied to speakers 203 via filters 202, and a sound pressure is measured at N points at a boundary of a control area 204. The particle velocity un(rj) in the normal line direction is obtained approximately from a sound pressure signal by a 2 microphone method.

At this time, for reproducing the N sound pressures p(rj) and particle velocities un(rj), sound pressures at 2N points only need to be the same as an original sound field. This boils down to the question of obtaining, as a transfer function Hi (i=1 to M) of the filters 202, a value with which the sound pressures at 2N points come closest to the original sound field.

In this regard, a transfer function between a sound source i (i=1 to M) in a reproduction sound field and a sound-receiving point j (j=1 to 2N) is represented by Cij, and a transfer function of the filter before the sound source i is represented by Hi. Further, with a transfer function between the sound source in the original sound field and the sound-receiving point j being represented by Pj, an evaluation function J for minimizing a difference between the reproduction sound field and the original sound field as expressed in Equation (4) of FIG. 13 will be discussed.

Equation (5) of FIG. 13 only needs to be solved for obtaining the transfer function Hi with which the evaluation function J expressed by Equation (4) is minimized.

Figure 15:
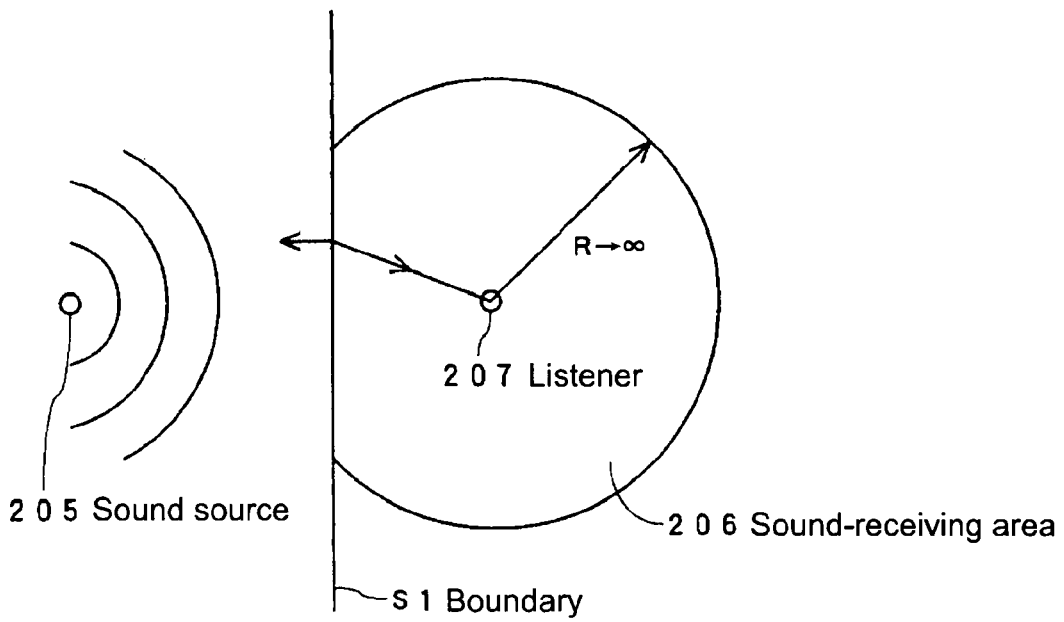
FIG. 15 is a diagram showing an extension principle of the Kirchhoff integration formula to a half space.

Furthermore, as an extension of the Kirchhoff integration formula to a half space, a case where a sound source 205 is provided in a space on one side of a boundary S1 (left-hand side in figure) and a sound-receiving area 206 not including a sound source is provided in a space on the other side (right-hand side in figure) as shown in FIG. 15 will be considered.

If the sound pressures and particle velocities at all the points on the boundary S1 or the discrete points as described above are controlled by the Kirchhoff integration formula, a desired sound field can be realized in the sound-receiving area 206 not including a sound source.

Figure 16:
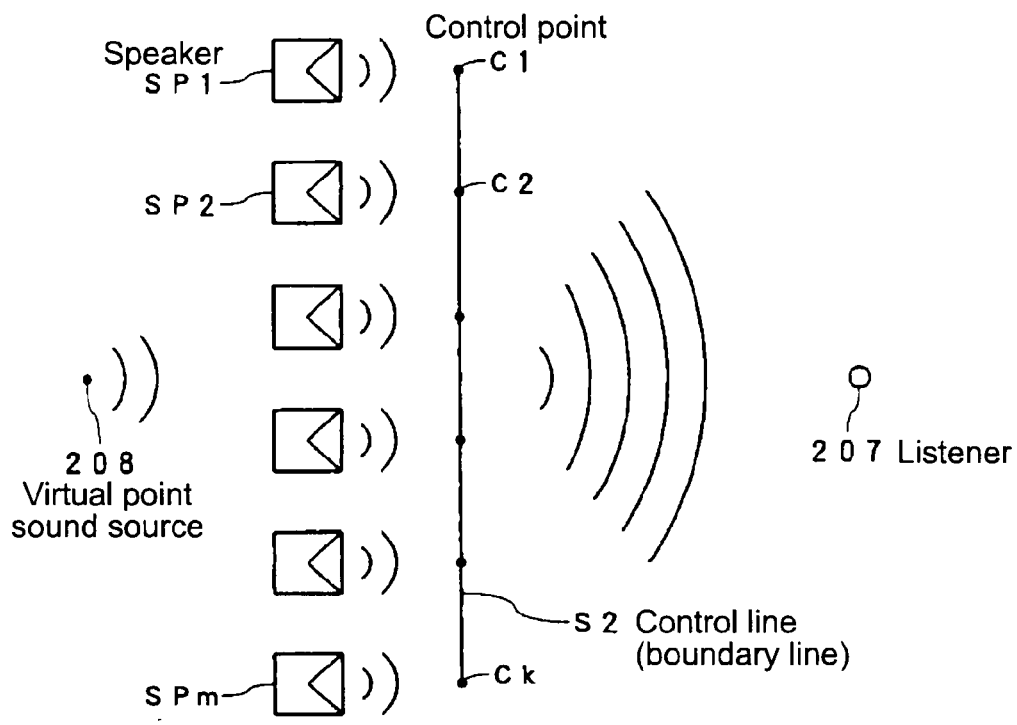
FIG. 16 is a diagram showing a specific extension example of the Kirchhoff integration formula to the half space.

Specifically, as shown in FIG. 16, a plurality of speakers SP1, SP2, . . . , and SPm are arranged on a left-hand side (one side) of a certain finite-length control line (boundary line) S2, and a plurality of control points C1, C2, . . . , and Ck are set on the control line S2. Then, a sound pressure (amplitude) and a phase at the control points C1, C2, . . . , and Ck are controlled.

As a result, in a sound-receiving area on a right-hand side of the control line S2, a listener 207 can listen to sounds from the speakers SP1, SP2, . . . , and SPm as sounds from a virtual point sound source (virtual sound source) 208 on the left-hand side of the control line S2.

Here, as shown in FIG. 16, the sound-receiving area on the right-hand side of the control line S2 is an area on the other side of the speakers SP1, SP2, . . . , and SPm, and the left-hand side of the control line S2 is the speakers SP1, SP2, . . . , and SPm side.

By thus controlling the phase and sound pressure (sound pressure level) of the audio signals supplied to the speakers, it is possible to generate and control a desired sound field. In other words, by controlling the phase and sound pressure of the audio signals supplied to the speakers of the array speaker using the wavefront synthesis technique, a sound image based on audio emitted from the speakers of the speaker portion 30 can be oriented to a desired position.

In this case, in image, audio emitted from the speakers is oriented (focused) to a target position (focal point of sounds) as in the case of focusing light on a target position.

In the case of Example 2, for orienting a sound image, the sound field controller 411 of the processing apparatus portion 40 shown in FIG. 6 controls a coefficient of the digital filters of the audio processor 410 respectively corresponding to the speakers in accordance with the three-dimensional coordinates from the sensor portion 10.

More specifically, a listener position is set in a formed sound field and a transfer function from a target virtual sound source to the listener position is obtained so that, based on the transfer function, the sound field controller 411 controls the coefficient of the digital filters of the audio processor 410.

In this case, the sound field controller 411 stores a necessary parameter such as a filter coefficient that corresponds to the transfer function corresponding to the possible virtual sound source. Moreover, the sound field controller 411 is capable of orienting a sound image to a position of a target virtual sound source by changing a parameter supplied to a digital filter circuit included in the audio processor 410 in accordance with the position of the target virtual sound source.

More specifically, in Example 2, as described with reference to FIG. 11, the three layers of the bottom layer BL, the medium layer ML, and the top layer TL are set in accordance with the distances from the sensor panel 10P. Moreover, for each layer, the three areas R1 to R3 are set in the lateral direction (x-axis direction) as described with reference to FIG. 7.

Figure 17:
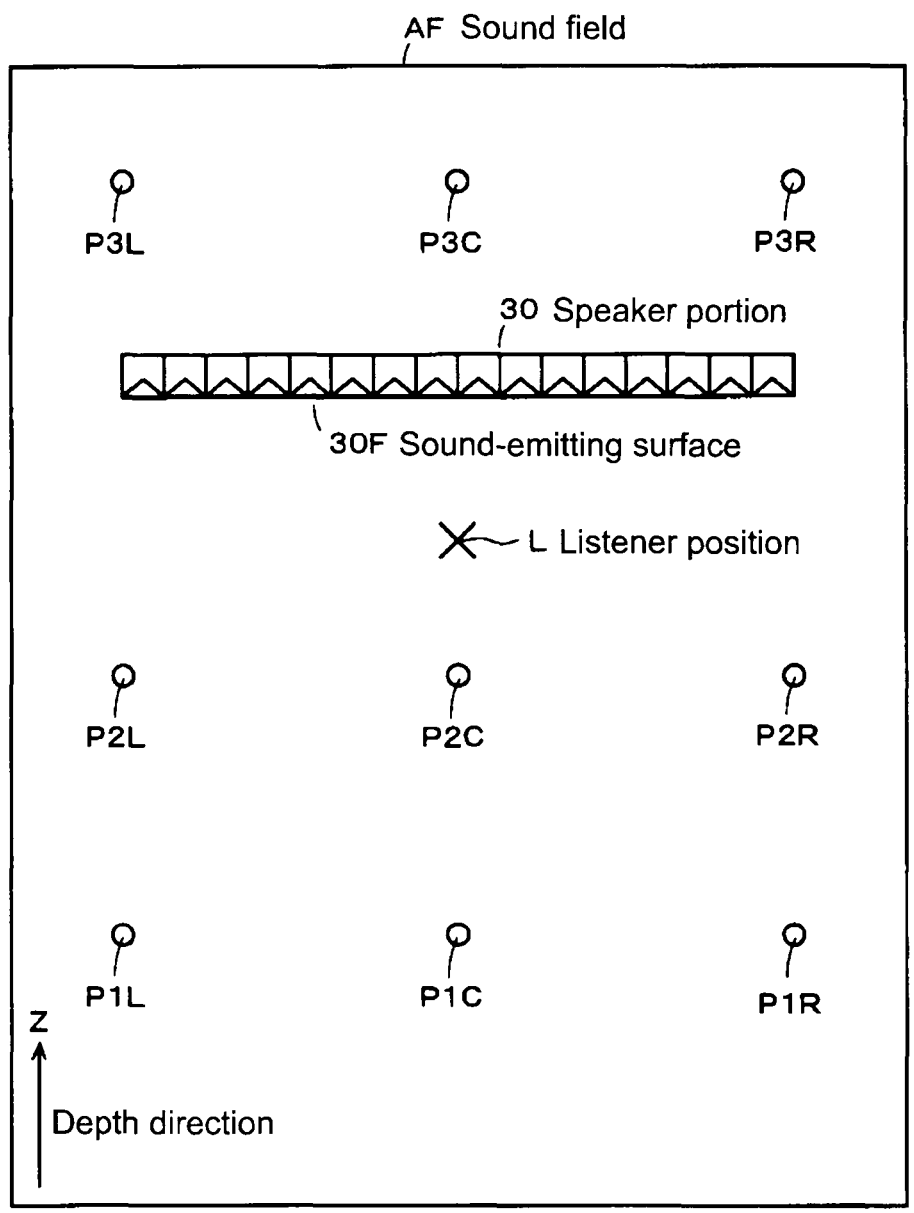
FIG. 17 is a diagram for explaining an example of virtual sound sources that have been set.

FIG. 17 is a diagram for explaining an example of the virtual sound sources that have been set in Example 2. In FIG. 17, a sound field AF is a sound field formed by audio emitted from the speaker portion 30.

In the example shown in FIG. 17, a listener position L is set at a position opposed to a sound-emitting surface of the speaker portion 30. Virtual sound sources P1L, P1C, and P1R are set behind the listener position L. Moreover, virtual sound sources P2L, P2C, and P2R are set slightly rearward from the listener position L, and virtual sound sources P3L, P3C, and P3R are set in front of the listener position L.

Prepared in the sound field controller 411 are parameters to be supplied to the digital filters of the audio processor 410 corresponding to the respective speakers for orienting a sound image to the virtual sound sources P1L, P1C, P1R, P2L, P2C, P2R, P3L, P3C, and P3R.

When the detection target object such as a hand of a user is brought close to the sensor panel 10P, the three-dimensional coordinates designated by the detection target object are detected by the sensor portion 10 and supplied to the processing apparatus portion 40.

Then, based on the three-dimensional coordinates, the spatial position detection portion 405 judges the layer and the area within that layer (two-dimensional coordinate area) to which the three-dimensional coordinates belong. In other words, the spatial position detection portion 405 judges to which of the bottom layer BL, the medium layer ML, and the top layer TL and which of the areas R1 to R3 shown in FIG. 7 of that layer the three-dimensional coordinates from the sensor portion 10 belong.

After that, the spatial position detection portion 405 controls the sound field controller 411 via the CPU 401, for example, based on the judgment result. Then, under control of the spatial position detection portion 405, the sound field controller 411 sets parameters to the digital filters of the audio processor 410 so as to orient a sound image to a position of a target virtual sound source.

Specifically, when judged that the three-dimensional coordinates as a detection output from the sensor portion 10 belong to the area R1 of the top layer TL, a sound image is oriented to the virtual sound source P1L shown in FIG. 17.

Further, when judged that the three-dimensional coordinates as the detection output from the sensor portion 10 belong to the area R2 of the top layer TL, a sound image is oriented to the virtual sound source P1C shown in FIG. 17.

Further, when judged that the three-dimensional coordinates as the detection output from the sensor portion 10 belong to the area R3 of the top layer TL, a sound image is oriented to the virtual sound source P1R shown in FIG. 17.

Similarly, when judged that the three-dimensional coordinates as the detection output from the sensor portion 10 belong to the area R1 of the medium layer ML, a sound image is oriented to the virtual sound source P2L shown in FIG. 17.

Further, when judged that the three-dimensional coordinates as the detection output from the sensor portion 10 belong to the area R2 of the medium layer ML, a sound image is oriented to the virtual sound source P2C shown in FIG. 17.

Further, when judged that the three-dimensional coordinates as the detection output from the sensor portion 10 belong to the area R3 of the medium layer ML, a sound image is oriented to the virtual sound source P2R shown in FIG. 17.

Similarly, when judged that the three-dimensional coordinates as the detection output from the sensor portion 10 belong to the area R1 of the bottom layer BL, a sound image is oriented to the virtual sound source P3L shown in FIG. 17.

Further, when judged that the three-dimensional coordinates as the detection output from the sensor portion 10 belong to the area R2 of the bottom layer BL, a sound image is oriented to the virtual sound source P3C shown in FIG. 17.

Further, when judged that the three-dimensional coordinates as the detection output from the sensor portion 10 belong to the area R3 of the bottom layer BL, a sound image is oriented to the virtual sound source P3R shown in FIG. 17.

As described above, in Example 2, it is possible to change the position to emit audio in view of the layer designated by the detection target object such as a hand of a user.

In this case, the position of the virtual sound source can also be changed in the z-axis direction in accordance with the layer to which the detection target object belongs.

As can be seen from the descriptions above, in Example 2, the function of the sensor means is realized by the sensor portion 10. Moreover, the function of the judgment means is mainly realized by the spatial position detection portion 405. Moreover, the function of the output means is realized by the audio processor 410, the sound field controller 411, the amplifier portion 412, and the speaker portion 30.

(Modified Example of Example 2 of Audio Output Processing) (Claim 3)

It should be noted that the setting position of the virtual sound sources described with reference to FIG. 17 is a mere example, and various other setting positions of the virtual sound sources are also possible.

For example, a sound image is oriented to the virtual sound source P1C at a time a position designated by the detection target object belongs to the top layer TL, without taking into account the areas set in each layer in the two-dimensional coordinate area. Moreover, a sound image is oriented to the virtual sound source P2C at a time the position designated by the detection target object belongs to the medium layer ML. Moreover, a sound image is oriented to the virtual sound source P3C at a time the position designated by the detection target object belongs to the bottom layer BL.

As described above, it is also possible to set a single virtual sound source for each layer and emit audio from the virtual sound source that is determined in accordance with the layer to which the position designated by the detection target object such as a hand belongs.

Further, which layer the three-dimensional coordinates from the sensor portion 10 belong to and where in the two-dimensional coordinate area of that layer is being designated can be accurately judged by the function of the spatial position detection portion 405.

Presupposing that the detection target object is a hand of a user, a position of a head of the user can also be estimated from the position indicated by the three-dimensional coordinates from the sensor portion 10.

In other words, a position of the hand of the user (e.g., height of shoulder of user from ground) can be estimated from the three-dimensional coordinates from the sensor portion 10, with the result that a height of the user can be estimated from the position of the hand of the user.

Furthermore, taking into account a mean value and the like of hand lengths of grownups, an approximate distance from the surface of the sensor panel 10P to the user can be estimated from the three-dimensional coordinates from the sensor portion 10.

Based on the estimated height of the user and the approximate distance from the surface of the sensor panel 10P to the user, the position of the user (position of head of user) with respect to the sensor panel 10P can be estimated.

Moreover, it is also possible to set a virtual sound source near the head (ear) of the user in accordance with the estimated position of the user and orient a sound image to the virtual sound source. Thus, audio can be favorably emitted to only the user who has moved his/her hand with respect to the sensor panel 10P.

In this case, the estimation of the position of the user can be carried out by the CPU 401 based on the detection result of the spatial position detection portion 405. Also the process of specifying a position of the virtual sound source in accordance with the estimated position of the user can be carried out by the CPU 401.

In this case, by creating in advance a table in which the position of the user (position of head) and the position of the virtual sound source are associated with each other, the position of the virtual sound source can be specified uniquely based on the estimated position of the user.

Also in this case, for example, the sound field controller 411 stores parameters such as coefficients set in the digital filters of the audio processor 410 corresponding to the respective speakers in accordance with the virtual sound sources.

Accordingly, it is possible to set an appropriate coefficient to the digital filters of the audio processor 410 in accordance with the positions of the virtual sound sources set based on the estimated position of the user and orient a sound image to the set virtual sound sources.

As can bee seen from the descriptions above, in the modified example of Example 2, the function of the estimation means for estimating the position of the user is realized by the spatial position detection portion 405 and the CPU 401. It should be noted that also in the modified example, the function of the sensor means is realized by the sensor portion 10, the function of the judgment means is realized by the spatial position detection portion 405, and the function of the output means is realized by the audio processor 410, the sound field controller 411, the amplifier portion 412, and the speaker portion 30.

(Summary of Operation of Example 2 of Audio Output Processing)

Figure 18:
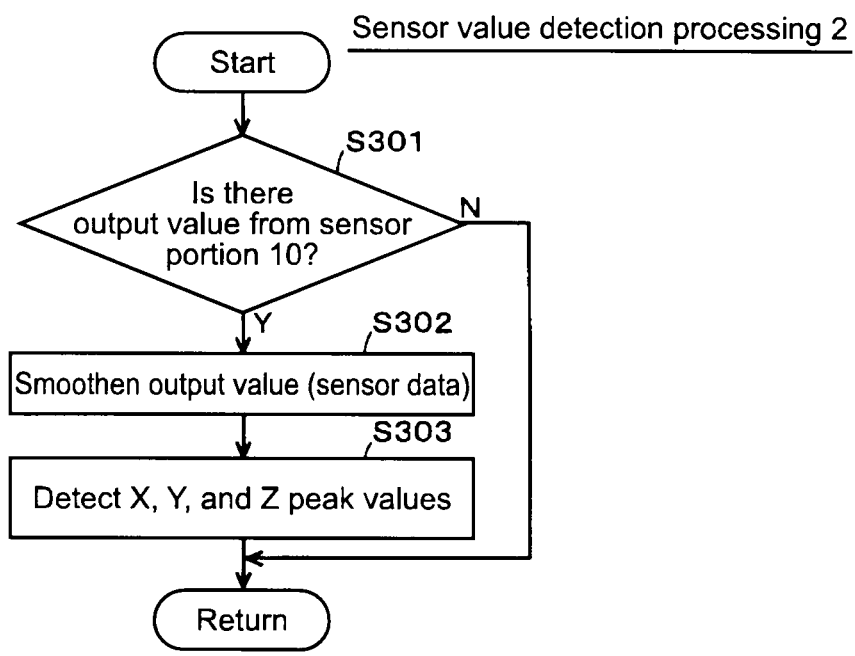
FIG. 18 is a flowchart for explaining sensor value detection processing.
Figure 19:
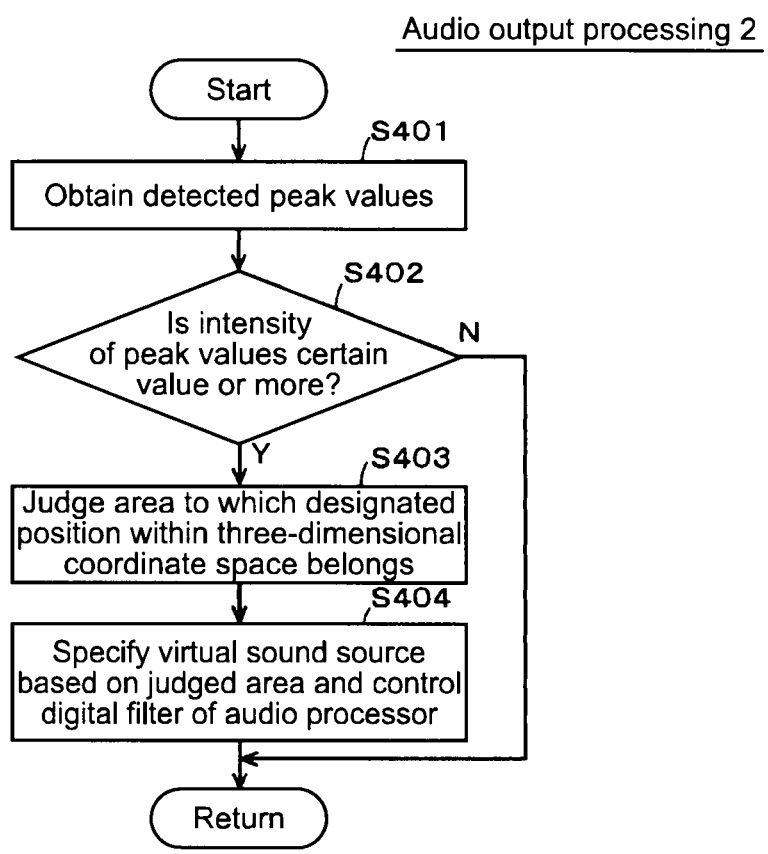
FIG. 19 is a flowchart for explaining audio output processing.

Next, Example 2 of the audio output processing will be summarized using the flowcharts of FIGS. 18 and 19. FIG. 18 is a flowchart for explaining sensor value detection processing 2 that is carried out by the spatial position detection portion 405 of the processing apparatus portion 40. Further, FIG. 19 is a flowchart for explaining audio output processing 2 that is mainly carried out by the spatial position detection portion 405 of the processing apparatus portion 40.

The processing shown in FIG. 18 is processing executed repetitively at predetermined intervals by the spatial position detection portion 405 like the sensor value detection processing 1 described with reference to FIG. 9. In the sensor value detection processing 1 shown in FIG. 9, X and Y as peak values on the x and y axes have been detected. However, in the sensor value detection processing 2 shown in FIG. 18, X, Y, and Z as peak values on the x, y, and z axes are detected.

Therefore, in the processing shown in FIG. 18, processes that are the same as those of Steps S101 and S102 shown in FIG. 9 are carried out in Steps S301 and S302. In other words, the spatial position detection portion 405 first judges whether an output value (sensor data) from the sensor portion 10 has been received via the I/O port 404 (Step S301).

The judgment process of Step S301 is a process of judging whether the detection target object such as a hand of a user has been moved with respect to the sensor panel surface of the sensor portion 10. More specifically, the judgment process is a process of judging whether a detection output from the sensor portion 10 received via the I/O port 404 has been stored in the ROM 402 as described above.

When judged in the judgment process of Step S301 that there is no output value from the sensor portion 10, the processing shown in FIG. 18 is ended to wait for the next execution timing. When judged in the judgment process of Step S301 that there is an output value from the sensor portion 10, the spatial position detection portion 405 carries out a process of smoothening the output value from the sensor portion 10 received by the processing apparatus portion 40 (Step S302).

The process of Step S302 is a process of calculating a mean value of a plurality of detection values (plurality of samples) from the sensor portion 10 for improving an accuracy of a detection value.

Then, the spatial position detection portion 405 detects peak values X, Y, and Z of the values in the x-axis direction, the values in the y-axis direction, and the values in the z-axis direction in the three-dimensional coordinate space (Step S303). Specifically, since the output value from the sensor portion 10 is an integration value in the longitudinal and lateral directions as described above, a point at which the value becomes maximum is used as the detection value (coordinate value). Then, the processing shown in FIG. 18 is ended to wait for the next execution timing.

As described above, the spatial position detection portion 405 detects, based on the detection output from the sensor portion 10, a position (coordinates) designated by the detection target object such as a hand of a user in the three-dimensional coordinate space.

Information indicating the detected position (coordinates) within the three-dimensional coordinate space (peak values) is temporarily stored in a register inside the spatial position detection portion 405, the RAM 403, or the like.

Next, the spatial position detection portion 405 executes the audio output processing 2 shown in FIG. 19. First, the spatial position detection portion 405 obtains the peak values detected in the processing shown in FIG. 18 (information indicating position (coordinates) within three-dimensional coordinate space) (Step S401).

Then, the spatial position detection portion 405 judges whether an intensity of the obtained peak values is a certain value or more (Step S402). Similar to the process of Step S202 shown in FIG. 10, the process of Step S402 is a process for preventing a situation in which even a case where a hand of the user is accidentally brought close to the sensor panel surface of the sensor portion 10 is targeted for the processing, for example.

When judged in the judgment process of Step S402 that the intensity of the obtained peak values is smaller than a certain value, the spatial position detection portion 405 ends the processing shown in FIG. 19 and waits for the next execution timing.

When judged in the judgment process of Step S402 that the intensity of the obtained peak values is a certain value or more, the spatial position detection portion 405 judges the setting area within the three-dimensional coordinate space to which the three-dimensional coordinates (designated position) indicated by the obtained peak values belong (Step S403).

The judgment process of Step S403 is a process of judging to which area (areas R1 to R3) of what layer the three-dimensional coordinates indicated by the obtained peak values belong as described with reference to FIGS. 7 and 11.

Then, the spatial position detection portion 405 specifies a position of a virtual sound source based on the judgment result of Step S403 via the CPU 401 and controls the digital filters of the audio processor 410 via the sound field controller 411 (Step S404).

Specifically, based on the wavefront synthesis technique, the sound field controller 411 controls the coefficient of the digital filters of the audio processor 410 that correspond to the respective speakers and emits reproduction audio with a position corresponding to the position designated by the user as the virtual sound source.

Then, the processing shown in FIG. 19 is ended, and the spatial position detection portion 405 waits for the next execution timing of the processing shown in FIG. 19.

As described above, in the case of Example 2 of the audio output processing, to describe it briefly, the virtual sound source to emit audio is specified in accordance with the position of the detection target object such as a hand of a user within the three-dimensional coordinate space. Then, using the wavefront synthesis technique, audio information is processed so that audio is emitted from the speaker portion 30 as if it is being emitted from the specified virtual sound source.

EXAMPLE 3 OF AUDIO OUTPUT PROCESSING

Claim 6

Next, Example 3 of the audio output processing capable of being carried out by the information processing apparatus of this embodiment will be described. In Example 3, audio information is stored by the storage means for each of the areas set in each of the plurality of layers.

A layer that the detection target object such as a hand of a user has passed and a layer that the detection target object has reached are specified. Audio information corresponding to an area of the layer that the detection target object has passed and audio information corresponding to an area of the layer that the detection target object has reached, that are stored by the storage means, are mixed to be output.

(Layer and Area within Layer)

Figure 20:
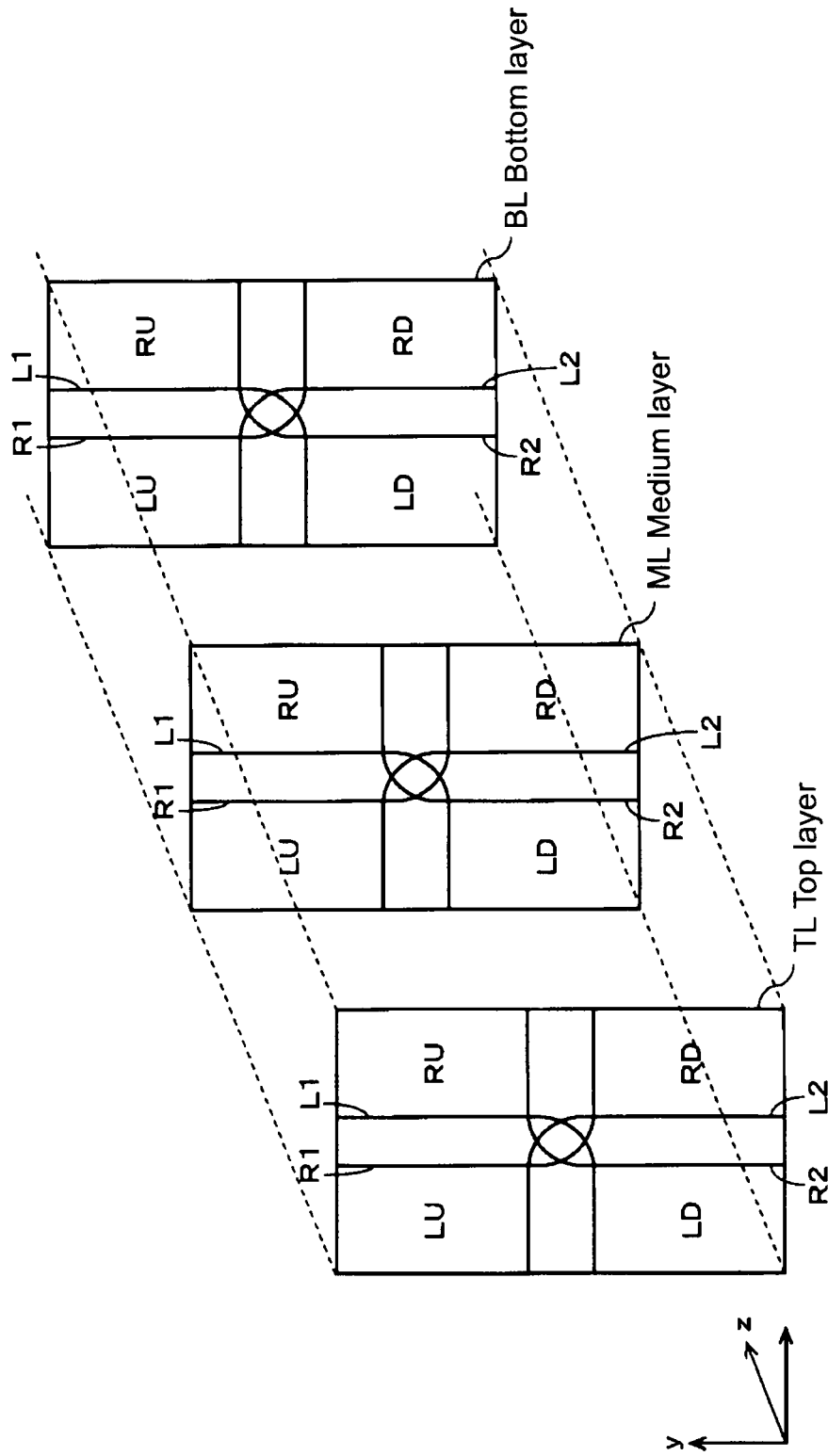
FIG. 20 is a diagram for explaining three layers and areas set in each of the layers.

FIG. 20 is a diagram for explaining three layers set as described with reference to FIG. 11 and areas set in each of the layers in Example 3.

As described with reference to FIG. 11, also in Example 3, the three layers of the bottom layer BL, the medium layer ML, and the top layer TL are set in accordance with differences in the distance from the surface of the sensor panel 10P as shown in FIG. 20.

As shown in FIG. 20, in each of the layers, the two-dimensional coordinate area (x-y plane) of the layer is bisected in the horizontal and vertical directions so as to set 4 large areas.

Specifically, in the example of FIG. 20, set in each of the layers are an upper left-hand area LU surrounded by the solid line L1, an upper right-hand area RU surrounded by the solid line R1, a lower left-hand area LD surrounded by the solid line L2, and a lower right-hand area RD surrounded by the solid line R2. Moreover, as shown in FIG. 20, the areas LU, RU, LD, and RD overlap one another at boundary portions (overlapped portions).

In Example 3, different pieces of audio information are allocated to the areas in each of the layers. As described above, audio information allocated to each of the areas of the layers is stored in the audio information storage portion 407.

FIG. 21 is a diagram for explaining a structure of the audio information stored in the audio information storage portion 407. In Example 3, the audio information storage portion 407 stores layer-specific, area-specific audio information to be reproduced as shown in FIG. 21.

Further, as shown in FIG. 21, audio information of an accompaniment part is allocated to the top layer TL. Specifically, audio information of a treble part of a string instrument is allocated to the upper left-hand area LU of the top layer TL, and audio information of a treble part of a brass wind is allocated to the upper right-hand area RU of the top layer TL.

Moreover, audio information of a basso of a string instrument is allocated to the lower left-hand area LD of the top layer TL, and audio information of a basso of a brass wind is allocated to the lower right-hand area RD of the top layer TL.

Furthermore, as shown in FIG. 21, audio information of a part of an accompaniment part and a solo part is allocated to the medium layer ML. Specifically, audio information of a string instrument (gamut) and audio information of a treble part of a flute are allocated to the upper left-hand area LU of the medium layer ML. Moreover, audio information of a brass wind (gamut) and audio information of a treble part of a xylophone are allocated to the upper right-hand area RU of the medium layer ML.

Further, audio information of a string instrument (gamut) and audio information of a basso of a woodwind instrument are allocated to the lower left-hand area LD of the medium layer ML, and audio information of a brass wind (gamut) and audio information of a basso of a female vocal (female voice) are allocated to the lower right-hand area RD of the medium layer ML.

Moreover, as shown in FIG. 21, audio information of a solo part is allocated to the bottom layer BL. Specifically, audio information of a harps and a flute is allocated to the upper left-hand area LU of the bottom layer BL, and audio information of a harps and a xylophone is allocated to the upper right-hand area RU of the bottom layer BL.

Furthermore, audio information of a woodwind instrument and a female vocal is allocated to the lower left-hand area LD of the bottom layer BL, and audio information of a xylophone and a female vocal is allocated to the lower right-hand area RD of the bottom layer BL. It should be noted that the audio information of a solo part allocated to each area of the bottom layer BL is for gamut.

As described above, in Example 3, pieces of audio information (music files) of 12 tracks that are respectively allocated to the 12 areas within the three layers are stored in the audio information storage portion 407.

Also in Example 3, when the detection target object such as a hand of a user is brought close to the surface of the sensor panel 10P, the sensor portion 10 outputs three-dimensional coordinates of a position designated by the detection target object.

Then, the spatial position detection portion 405 judges to which area (which layer and which area within that layer) the position designated by the detection target object such as a hand of a user belongs. Based on a result of the judgment, the CPU 401 controls the audio processor 410 to perform audio information mix processing.

For example, in a case where layers and areas within the layers are set as described with reference to FIG. 20, at a time a hand or the like of a user is positioned in the upper left-hand area LU of the top layer TL, the audio information of a treble part of a string instrument is output from the speaker portion 30.

Furthermore, when the hand or the like of the user has reached the upper left-hand area LU of the medium layer ML, audio corresponding to audio information obtained by mixing all the audio information of a treble part of a string instrument, the audio information of a string instrument (gamut), and the audio information of a treble part of a flute is emitted from the speaker portion 30.

In addition, at a time the hand or the like of the user has reached the upper left-hand area LU of the bottom layer BL, audio corresponding to audio information obtained by mixing all the audio information of a treble part of a string instrument, the audio information of a string instrument (gamut), the audio information of a treble part of a flute, the audio information of a harp, and audio information of a flute is emitted from the speaker portion 30.

As described above, in Example 3, as described with reference to FIGS. 20 and 21, pieces of audio information stored in the audio information storage portion 407 for the respective areas set in each of the plurality of layers are used.

Moreover, the layer that the detection target object such as a hand of a user has passed and the layer that the detection target object has reached are specified. Then, the audio information corresponding to the area of the layer that the detection target object has passed and the audio information corresponding to the area of the layer that the detection target object has reached, that are stored in the audio information storage portion 407, are mixed by the audio processor 410 and output.

As described above, it is possible to select necessary pieces of audio information based on the position of the detection target object such as a hand of a user with respect to the sensor panel 10P of the sensor portion 10. In addition, the selected pieces of audio information can be mixed, and audio corresponding to the mixed audio information can be emitted.

Figures 22, 23:
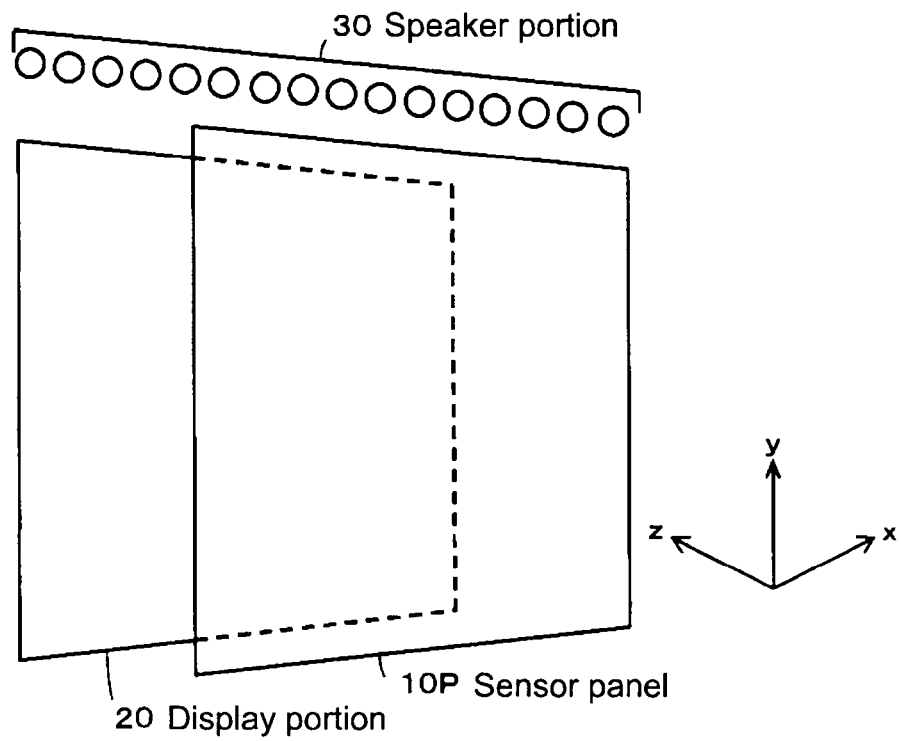
FIG. 22 is a diagram schematically showing a structure of a part that receives a user operation and provides information to a user in the information processing apparatus of this embodiment.
FIG. 23 is a diagram for explaining a calculation carried out during mix processing of audio information.

Next, the audio information mix processing carried out in Example 3 will be described in detail. FIG. 22 is a diagram schematically showing a structure of a part that receives a user operation and provides information to the user in the information processing apparatus of this embodiment. Moreover, FIG. 23 is a diagram for explaining a calculation carried out during the audio information mix processing.

As shown in FIG. 22, the part that receives a user operation and provides information to the user corresponds to the display portion 20, the sensor panel 10P provided in front of the display portion 20, and the speaker portion 30 provided at an upper portion of the display portion 20, for example.

The sensor portion 10 including the sensor panel 10P is capable of detecting, when the detection target object such as a hand of a user is brought close to the sensor panel 10P, three-dimensional coordinates of a position designated by the detection target object and outputting the three-dimensional coordinates to the processing apparatus portion 40.

In Example 3, even when the user has not moved his/her hand with respect to the sensor panel 10P, pieces of audio information of 12 tracks that are stored in the audio information storage portion 407 are reproduced repetitively at all times.

In other words, as described with reference to FIG. 21, the CPU 401 reads out the pieces of audio information of 12 tracks that are stored in the audio information storage portion 407 and supplies them to the audio processor 410. At this time, however, the audio information mix processing is not carried out by the audio processor 410, and audio corresponding to the audio information is thus not output from the speaker portion 30.

When the detection target object such as a hand of a user is brought close to the sensor panel 10P of the sensor portion 10, the sensor portion 10 detects three-dimensional coordinates of a position designated by the detection target object and supplies the three-dimensional coordinates to the processing apparatus portion 40.

In this case, the spatial position detection portion 405 obtains adjusted three-dimensional coordinates to be used for the audio information mix processing from the three-dimensional coordinates from the sensor portion 10. Then, the spatial position detection portion 405 judges the area within the sensor area (three-dimensional coordinate space) to which the adjusted three-dimensional coordinates belong.

In addition, the spatial position detection portion 405 judges the area that a hand of a user or the like has passed and the area that it has reached within the sensor area (three-dimensional coordinate space formed by the sensor portion 10, in which coordinates can be detected) based on a result of judging the area to which the adjusted three-dimensional coordinates belong.

Then, based on the judgment result, the spatial position detection portion 405 judges which audio information allocated to what area is to be output and notifies the audio processor 410 of the judgment result. Based on the judgment result from the spatial position detection portion 405, the audio processor 410 changes a mix volume (mix adjustment value) with respect to the pieces of audio information to be output. Accordingly, the pieces of audio information to be output are mixed by the audio processor 410 and supplied to the speaker portion 30 via the amplifier portion 412 so that audio corresponding to the position designated by the detection target object such as a hand of a user is emitted.

In Example 3, as expressed in Equation (1) of FIG. 23, three-dimensional coordinates V as a detection output from the sensor portion 10 are represented by (X, Y, Z), and mix parameters v as parameters used in the audio information mix processing are represented by (x, y, z).

Using the three-dimensional coordinates V supplied from the sensor portion 10, the spatial position detection portion 405 obtains the mix parameters v as adjusted three-dimensional coordinates to be used in the audio information mix processing.

Specifically, the spatial position detection portion 405 obtains the coordinate value x of the mix parameters v on the x axis using Equation (3) of FIG. 23. In Equation (3), x' represents a value of x in a previous step. Moreover, α represents a predetermined value which is, for example, a value "0.00004" as shown in FIG. 23.

Similarly, the coordinate value y of the mix parameters v on the y axis is obtained by Equation (4) of FIG. 23. In Equation (4), y' represents a value of y in a previous step. Moreover, α represents a predetermined value which is, for example, a value "0.00004" as shown in FIG. 23.

Furthermore, the coordinate value z of the mix parameters v on the z axis is obtained by Equation (5) of FIG. 23. In Equation (5), z' represents a value of z in a previous step. Moreover, α1 represents a predetermined value, and a value different from the value a used for obtaining the coordinate values x and y is used as shown in FIG. 23. This is because the coordinate value z is a value on the coordinate axis that is orthogonal to the x axis and the y axis.

It should be noted that α1 as a coefficient for the z axis changes its value based on positive/negative of a value of (Z−z'). When (Z−z')>0, α1 is set to 0.0006, and when (Z−z') <0, α1 is set to 0.000015.

The reason for such a setting is because, when the detection target object such as a hand is distant from the sensor portion 10, it is more desirable to make the change slower (prolong release).

It should be noted that the values of α and α1 described above are not limited to those described above, and various other values may of course be used instead.

As described above, the mix parameters v=(x, y, z) are obtained by carrying out operations using the values α and α1 as index numbers while taking into account the mix parameters v' in the previous step, and the area to which the position designated by the user belongs is judged based on the obtained mix parameters v. Based on the judgment result, the pieces of audio information to be mixed are specified, the mix volume is adjusted, and audio corresponding to the mixed audio information is emitted.

Accordingly, the mix parameters v (exponentially) follow the movement of the three-dimensional coordinates V from the sensor portion 10 with a small delay. Then, the calculations shown in FIG. 23 are repeated in accordance with a sampling frequency (e.g., 48 kHz) of the audio information so that audio can be emitted smoothly even when the audio information to be used is changed based on the movement of the hand or the like of the user.

(Processing Carried Out in Case where Designated Position Moves Largely) (Claim 7)

When the detection target object such as a hand of a user is moved with respect to the surface of the sensor panel 10P of the sensor portion 10, the detection target object may move gradually and successively or may suddenly move largely to a distant position.

In the former case, since the mix parameters v that are used in the audio information mix processing smoothly follow the actual detection output (three-dimensional coordinates) V by the calculation processing described with reference to FIG. 23, reproduction audio can be prevented from becoming unnatural. Also in the latter case, reproduction audio can be prevented from becoming unnatural by the calculation processing described with reference to FIG. 23.

Figures 24, 25:
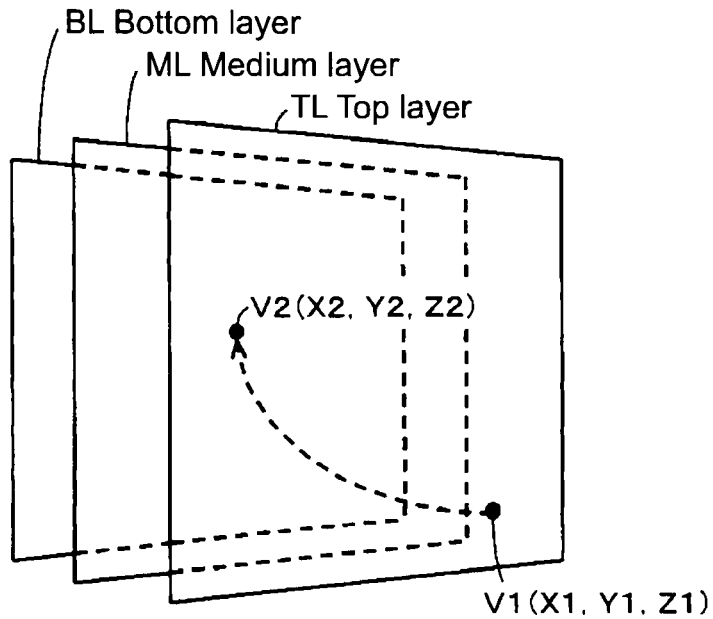
FIG. 24 is a diagram for explaining an example of a case where a detection target object such as a hand of a user has moved suddenly and largely in a sensor area (three-dimensional coordinate space) formed by the sensor portion.
FIG. 25 is a diagram for explaining calculation processing that is carried out in the case where the detection target object such as a hand of a user has moved suddenly and largely in the sensor area formed by the sensor portion.
Figure 26:
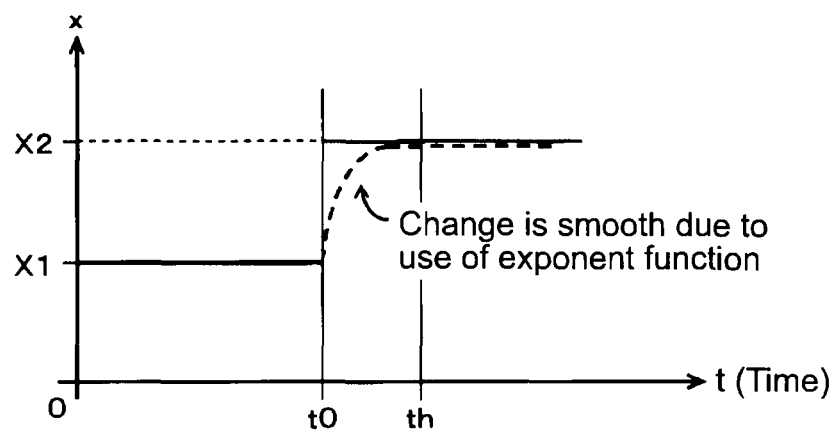
FIG. 26 is a diagram showing a state where mix parameters v obtained by the calculation processing shown in FIG. 25 change.

FIGS. 24 to 26 are diagrams for explaining processing carried out in a case where the designated position moves largely. Specifically, FIG. 24 is a diagram for explaining an example of a case where the detection target object such as a hand of a user has suddenly moved largely in the sensor area (three-dimensional coordinate space) formed by the sensor portion 10.

Further, FIG. 25 is a diagram showing calculation expressions for explaining a property of a change in the parameters in the case where the detection target object such as a hand of a user has suddenly moved largely in the sensor area (three-dimensional coordinate space) formed by the sensor portion 10. Further, FIG. 26 is a diagram showing an example of a state where the mix parameters v obtained by the calculation expressions shown in FIG. 25 change.

As shown in FIG. 24, a case where the detection target object such as a hand of a user designating a position V1 (X1, Y1, Z1) has suddenly moved to a position V2 (X2, Y2, Z2) will be discussed. In this case, a position within the two-dimensional coordinate area (x-y plane) may change within one layer or the position within the x-y plane as well as the layer to which the position belongs may both change.

As shown in FIG. 24, when the position designated by the detection target object such as a hand of a user moves largely to move to a different area, the movement of the mix parameters v (x, y, z) practically becomes an exponent function.

Specifically, when the position designated by the detection target object such as a hand of a user moves largely, the mix parameters v (x, y, z) have a property as expressed in the calculation expressions shown in FIG. 25.

In other words, the spatial position detection portion 405 can judge whether the position designated by the detection target object such as a hand of a user has moved largely based on the three-dimensional coordinates from the sensor portion 10.

For example, when it is detected that the detection target object has moved to a different area like from the lower right-hand area RD to the upper left-hand area LU at a time four areas are set in each layer as shown in FIG. 20, the detection target object may have moved within the same layer or may have moved to a different layer.

In this case, as expressed in Equation (1) of FIG. 25, a position indicated by three-dimensional coordinates before the movement (start point) are represented by V1=(X1, Y1, Z1), whereas a position indicated by three-dimensional coordinates after the movement (end point) is represented by V2=(X2, Y2, Z2).

The property of the mix parameters v obtained by the spatial position detection portion 405 can be expressed by Equations (3) to (5) of FIG. 25. In other words, the property of the coordinate value x(t) of the mix parameters v on the x axis at the time the movement is large can be expressed by Equation (3) of FIG. 25.

Similarly, the property of the coordinate value y(t) of the mix parameters v on the y axis at the time the movement is large can be expressed by Equation (4) of FIG. 25. Moreover, the property of the coordinate value z(t) of the mix parameters v on the z axis at the time the movement is large can be expressed by Equation (5) of FIG. 25.

It should be noted that in Equations (3) to (5), the value $\beta$ represents a value that is determined by the value $\alpha$ used in the calculation processing shown in FIG. 23 and is a value larger than 0. Specifically, $\beta$ is a value that can be obtained by $\beta=\alpha*f$. Here, the value f is a value that indicates how many times per second the processing is carried out, and a unit thereof is Hz. In addition, the value f is a value of about several-ten Hz, for example.

In Equations (3) to (5) of FIG. 25, an exponent function exp $(-\beta t)$ has a property that a value moves largely in a state where t is small (right after jump from position V1 to position V2).

Focusing on the coordinate on the x axis in the case where the detection target object such as a hand of a user has suddenly moved largely, it may look like the detection target object has actually jumped from the coordinate X1 to the coordinate X2 at a time t0 as indicated by the solid lines of FIG. 26.

However, by the calculation expressions shown in FIG. 25, it becomes possible to largely change the mix parameters right after the movement and gradually change them after that as indicated by the dotted line in FIG. 26.

Comparing Equations (3) to (5) of FIG. 25 with Equations (3) to (5) of FIG. 23 described above, it can be seen that all of them are exponent functions and Equations (3) to (5) of FIG. 23 are equations that can realize the properties of Equations (3) to (5) of FIG. 25.

In other words, Equations (3) to (5) of FIG. 25 are almost equivalent to Equations (3) to (5) of FIG. 23 described above.

Therefore, by obtaining the mix parameters v using the calculation expressions shown in FIG. 23, even when the detection target object such as a hand of a user is moved largely, it is possible to reproduce audio information in accordance with that movement without causing awkwardness.

Further, a case where the detection target object such as a hand of a user is moved 50 cm within the sensor area 111 and a case where it is moved twice as much, that is, 100 cm will be discussed.

In this case, looking at it simply, when a time required to move the detection target object 50 cm is "1", a time required to move it 100 cm becomes "2". However, by carrying out the calculation processing described with reference to FIG. 23 for realizing the properties of FIG. 25, a time required to move the detection target object 100 cm from the position V1 to the position V2 can be made shorter than twice as much (e.g., about 1.2 times).

In other words, in a case where the detection target object such as a hand of a user has moved largely, irrespective of a movement distance of the hand or the like of the user, by the calculation processing of FIG. 23, audio corresponding to audio information to be reproduced can be reproduced assuming that the hand or the like of the user has moved almost within a constant time period.

In other words, irrespective of the movement distance of the hand or the like of the user, it is possible to appropriately obtain the mix parameters v within a certain time period, determine audio information to be reproduced based on the areas determined by the mix parameters v=(x, y, z), and carry out the mix processing. Therefore, even when the designated position is moved largely, mixed reproduction audio to be reproduced is prevented from becoming unnatural.

Accordingly, even when the detection target object such as a hand of a user is moved largely from the start point V1 to the end point V2, the audio output processing is prevented from being carried out assuming that the detection target object has suddenly moved from the position V1 to the position V2 in the processing apparatus portion 40. Moreover, even when the reproduction audio is changed, the audio processing does not take time in accordance with the movement distance.

It should be noted that also in Example 3, regarding the position to emit audio, as described with reference to FIGS. 7 and 8, the speaker to be used out of the array speaker of 16 channels is switched based on the parameter in the x-axis direction (lateral direction) out of the three-dimensional coordinates.

In this case, for smoothly switching the speaker to emit audio, that is, for smoothly moving the position to emit audio, a cross fade of about 10 samples may be carried out, for example.

For example, a case where a position designated by the detection target object such as a hand of a user with respect to the surface of the sensor panel 10P of the sensor portion 10 has changed from the area R1 to the area R2 as described with reference to FIGS. 7 and 8 will be discussed.

In this case, during a period of, for example, 10 samples immediately after the change from the area R1 to the area R2, audio from the speakers SP1 and SP2 and audio from the speakers SP8 and SP9 are both output.

Then, a sound-emitting level (volume) of the audio output from the speakers SP1 and SP2 is gradually reduced, and a sound-emitting level (volume) of the audio output from the speakers SP8 and SP9 is gradually increased. As a result, the position to emit audio is moved smoothly.

It should be noted that here, whether the detection target object such as a hand of a user has moved largely is judged at a time a movement is made from one area to another area preset in the sensor area 111.

However, the present invention is not limited thereto, and the detection target object can be judged to have been moved largely in a case where it has moved a certain predetermined distance or more in at least the two-dimensional coordinate area (x-y plane).

The judgment can be made based on whether the movement distance, that is obtained based on the positions within the two-dimensional coordinate plane determined in accordance with the x coordinate values and the y coordinate values at the start and end points that correspond to the three-dimensional coordinates from the sensor portion 10, is a threshold value or more.

(Summary of Example 3 of Audio Output Processing)

Figure 27:
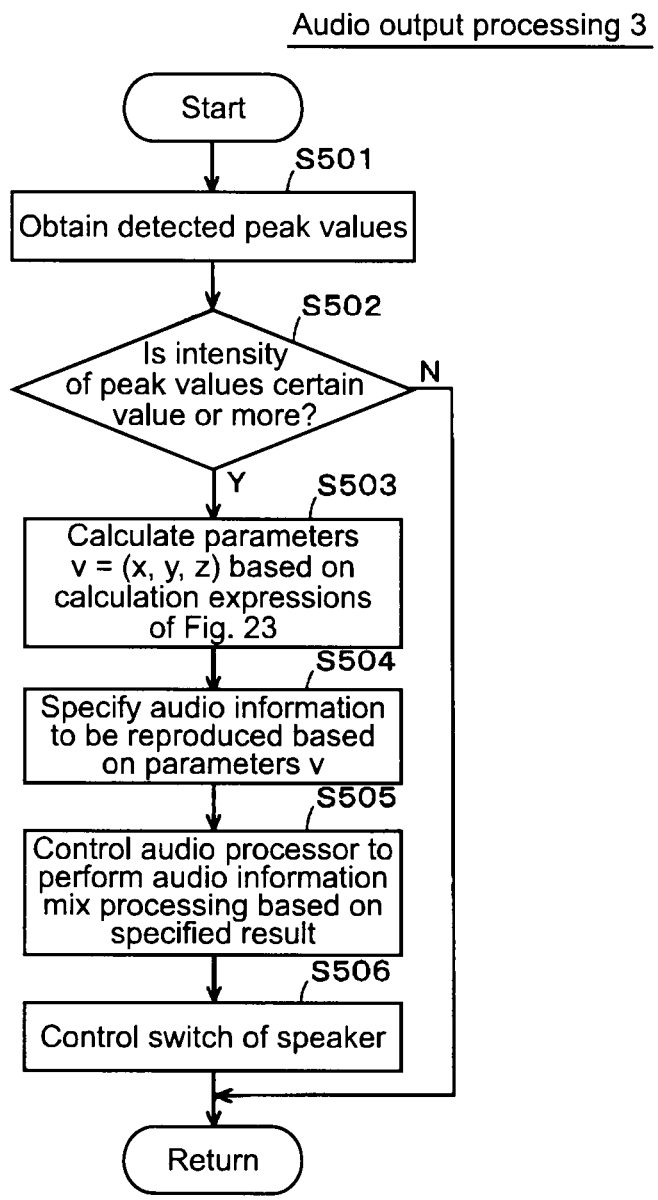
FIG. 27 is a flowchart for explaining audio output processing.
Figure 28:
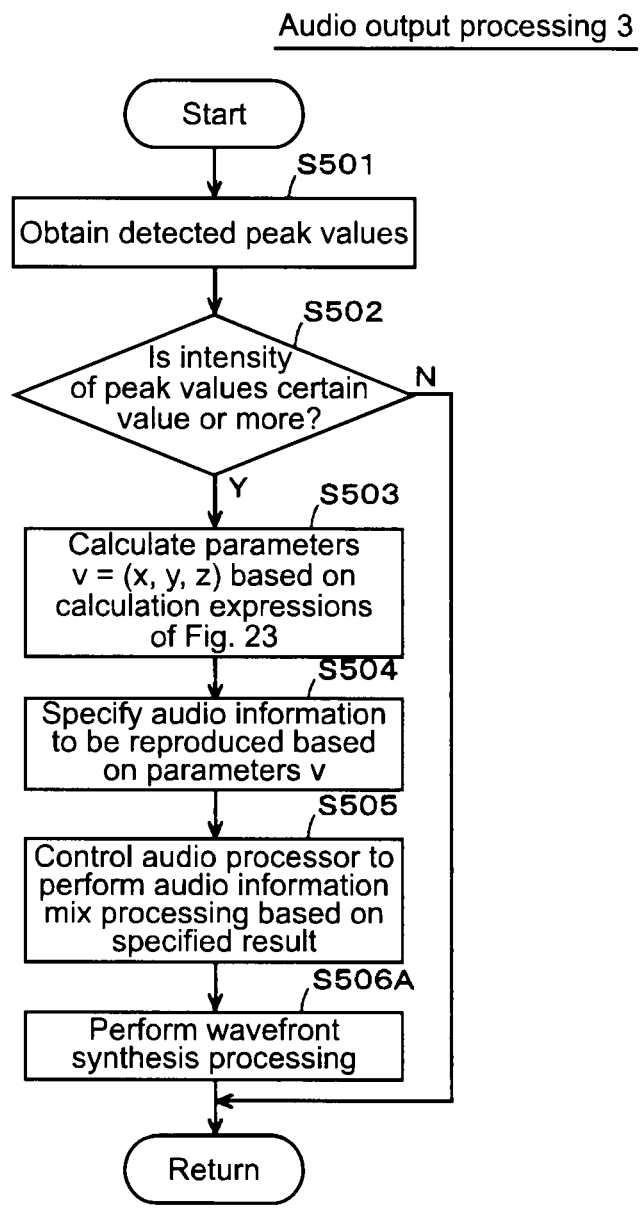
FIG. 28 is a flowchart for explaining a modified example of the audio output processing.

Next, Example 3 of the audio output processing will be summarized using the flowcharts of FIGS. 27 and 28. FIG. 27 is a flowchart for explaining audio output processing 3 for specifying and mixing audio information to be mixed based on a position designated by a hand or the like of a user and outputting mixed audio from the speaker corresponding to the designated position.

Moreover, FIG. 28 is a flowchart for explaining the audio output processing 3 for specifying and mixing audio information to be mixed based on a position designated by a hand or the like of a user and outputting the mixed audio from the speaker portion 30 as if it is being emitted from a virtual sound source corresponding to the designated position.

First, the processing shown in FIG. 27 will be described. Also in Example 3 of the audio output processing, the sensor value detection processing 2 described with reference to FIG. 18 is executed by the spatial position detection portion 405, and peak values X, Y, and Z of the values in the x-, y-, and z-axis directions within the three-dimensional coordinate space are detected.

After that, the spatial position detection portion 405 executes the processing shown in FIG. 27. First, the spatial position detection portion 405 obtains the peak values detected in the processing shown in FIG. 18 (information indicating position (coordinates) within three-dimensional coordinate space) (Step S501).

Then, the spatial position detection portion 405 judges whether an intensity of the obtained peak values is a certain value or more (Step S502). The process of Step s502 is a process for preventing a situation in which even a case where a hand of the user is accidentally brought close to the sensor panel surface of the sensor portion 10 is targeted for the processing, for example. In other words, the process is for detecting a case where the user has intentionally moved the detection target object such as a hand close to the sensor panel surface of the sensor portion 10.

When judged in the judgment process of Step S502 that the intensity of the obtained peak values is smaller than a certain value, the spatial position detection portion 405 ends the processing shown in FIG. 27 and waits for the next execution timing.

When judged in the judgment process of Step S502 that the intensity of the obtained peak values is a certain value or more, the spatial position detection portion 405 uses the obtained peak values V=(X, Y, Z) to obtain mix parameters v=(x, y, z) based on the calculation expressions of FIG. 23 (Step S503).

Then, based on the obtained mix parameters v, the spatial position detection portion 405 specifies the area that the detection target object such as a hand of a user has passed and the area that the detection target object has reached and specifies audio information to be reproduced based on those areas (Step S504).

After that, the spatial position detection portion 405 controls the audio processor 410 based on the specified result of Step S505 and carries out mix processing of the audio information to be reproduced (Step S505).

In addition, the spatial position detection portion 405 specifies the speaker to emit audio based on the area that the detection target object such as a hand of a user has reached and switches a speaker channel to be used for outputting audio corresponding to the mixed audio information from that speaker (Step S506). Then, the processing shown in FIG. 27 is ended to wait for the next execution timing.

As described above, it is possible to specify audio information to be reproduced based on the area to which the position designated by the detection target object such as a hand of a user belongs, mix the specified pieces of audio information, and emit audio from the speaker corresponding to the designated position.

Next, the processing shown in FIG. 28 will be described. As described above, the processing shown in FIG. 28 is processing of specifying and mixing audio information to be mixed based on a position designated by a hand or the like of a user and outputting audio from the speaker portion 30 as if it is being emitted from a virtual sound source corresponding to the designated position.

Therefore, in the flowchart shown in FIG. 28, steps in which the same processes as the steps in the flowchart of FIG. 27 are carried out are denoted by the same symbols, and descriptions thereof will be omitted.

As can be seen from comparing FIGS. 27 and 28, in FIG. 28, the process of Step S506A is different from the processing shown in FIG. 27.

In Step S506A, the specified and mixed audio information is processed so as to enable the user to listen to the audio as if it is being emitted from a virtual sound source corresponding to the position designated by the user.

Specifically, as in Example 2 of the audio output processing, the spatial position detection portion 405 specifies a virtual sound source based on the area to which the position designated by the user belongs and controls the digital filter of the audio processor 410 via the sound field controller 411 based on the specified virtual sound source.

Accordingly, audio corresponding to the mixed audio information is emitted from the speaker portion 30 constituted of an array speaker as if it is being emitted from the specified virtual sound source.

As described above, the pieces of audio information to be mixed are specified and mixed based on the area that the detection target object such as a hand of a user has passed and the area that the detection target object has reached. It is also possible to carry out sound image orientation processing using the wavefront synthesis technique so as to enable the user to listen to the audio corresponding to the mixed audio information as if it is being emitted from the virtual sound source corresponding to the position designated by the hand or the like of the user.

It should be noted that in Example 3 above, each layer is divided into four areas LU, RU, LD, and RD that have overlapped portions between the adjacent areas. Audio information of the adjacent areas are mixed in the overlapped area.

With such a structure, even when the detection target object such as a hand of a user is moved to a different area within the same layer, for example, audio to be output is changed naturally instead of being changed all of a sudden.

In Example 3 above, each of the layers is divided into the four layers LU, RU, LD, and RD, though not limited thereto. Two or more areas can be provided in each layer.

Moreover, the areas do not necessarily need to be of the same size, and positions and sizes of the areas may vary. In addition, it is of course possible to differentiate the position and size of the areas for each of the layers.

It should be noted that as is apparent from the descriptions above, in Example 3 of the audio output processing, the storage means is realized by the audio information storage portion 407. Moreover, the function of the sensor means is realized by the sensor portion 10. The function of the judgment means is realized by the spatial position detection portion 405. Further, the function of the output means is mainly realized by the audio processor 410, the amplifier portion 412, and the speaker portion 30. Moreover, the function of the coordinate adjustment means is realized by the spatial position detection portion 405.

(Modified Example 1 of Example 3 of Audio Output Processing) (Claims 4 and 5)

In Example 3 of the audio output processing described above, audio information to be reproduced has been allocated to each of the areas set in each of the layers, and pieces of audio information to be mixed have been specified based on the area that the detection target object has passed and the area that the detection target object has reached, though not limited thereto.

For example, it is possible to allocate audio information to each layer without setting the areas in the layers, which is the same as setting one area for each layer.

It is possible to output only audio allocated to the layer to which the position designated by the detection target object such as a hand of a user belongs. It is also possible to mix the audio information allocated to the layer that the detection target object has passed and the audio information allocated to the layer that the detection target object has reached and output audio corresponding to the mixed audio information.

In the former case, the spatial position detection portion 405 only needs to judge the layer to which the position designated by the hand or the like of the user belongs and control the audio processor 410 to output audio corresponding to audio information allocated to that layer.

In this case, as in Example 3 above, the speaker to emit audio can be changed in accordance with the position designated by the user. Further, by controlling the digital filters of the audio processor 410 via the sound field controller 411, a control can be performed as if audio is being emitted from a virtual sound source.

In the latter case, since only one area is set in each layer, audio information allocated to the layer that the detection target object such as a hand of a user has passed and audio information allocated to the layer that the detection target object has reached are mixed and output by the spatial position detection portion 405.

Also in this case, as in Example 3 of the audio output processing described above, the speaker to emit audio can be changed in accordance with the position designated by the user. Moreover, by controlling the digital filters of the audio processor 410 via the sound field controller 411, a control can be performed as if audio is being emitted from a virtual sound source.

It should be noted that although three layers are used in Example 3 of the audio output processing, the number of layers is not limited to three, and two or more arbitrary layers may be set and used. It should be noted that it is desirable to appropriately set the number of layers in accordance with a detection sensitivity of the sensor portion 10.

(Video Display Processing) (Claim 8)

As described above, the information processing apparatus of this embodiment is capable of controlling output processing of audio information based on a position designated by the detection target object such as a hand of a user within the three-dimensional coordinate space detected via the sensor portion 10. Specifically, the information processing apparatus is capable of changing a speaker to be used, setting a virtual sound source, and specifying and mixing audio information to be mixed based on the position designated by the detection target object.

The information processing apparatus of this embodiment is capable of performing control in accordance with a position designated by the detection target object in not only the audio output processing but also the video display processing.

In other words, as described above, in the information processing apparatus of this embodiment, video information stored in the video information storage portion 406 is read out by the CPU 401 and supplied to the display portion 20 via the physics calculation processor 408 and the display processor 409.

In this case, the physics calculation processor 408 imparts an effect according to a physics model to video information in accordance with a designated position designated by the detection target object such as a hand of a user in the three-dimensional coordinate space as described above.

In this example, rings (watering) are used as the physics model. FIG. 29 is a diagram for explaining a case where rings are generated on a displayed video in accordance with the designated position designated by the detection target object such a hand of a user in the three-dimensional coordinate space. Further, FIG. 30 are diagrams for explaining specific examples of a physics model for generating rings on the displayed video.

As shown in FIG. 29, in a case where the user has brought his/her hand close to the sensor panel 10P, the physics calculation processor 408 performs a calculation with respect to video information supplied thereto so as to generate rings around a position designated by the hand of the user within the three-dimensional coordinate space.

When the hand of the user is moved from a position at which a hand in a dotted line is place to a position at which a hand in a solid line is placed in FIG. 29, rings are also displayed in accordance with the position of the moved hand. In the calculation in this case, regarding a video that is based on video information to be reproduced as a water surface, accelerations in a direction perpendicular to the water surface are added with the position designated by the hand or the like of the user as a center.

In this case, the accelerations to be added are not one but widespread, and a distribution thereof is obtained by combining several Gauss functions. In other words, by combining the Gauss function that changes in a positive direction as shown in FIG. 30A and the Gauss function that changes in a negative direction as shown in FIG. 30B, a function that changes in both the positive direction and the negative direction as shown in FIG. 30C is formed.

The center of the distribution indicated by the downward arrow corresponds to the two-dimensional coordinates (x, y) out of the three-dimensional coordinates determined by the detection output from the sensor portion 10, and a shape (size) thereof is changed in accordance with a depth z in the direction orthogonal to the sensor panel 10P (z-axis direction).

Accordingly, as shown in FIG. 29, it is possible for the physics calculation processor 408 to impart an effect so as to generate rings with respect to the video information in accordance with the position designated by the detection target object such as a hand of a user within the three-dimensional coordinate space.

Figure 31:
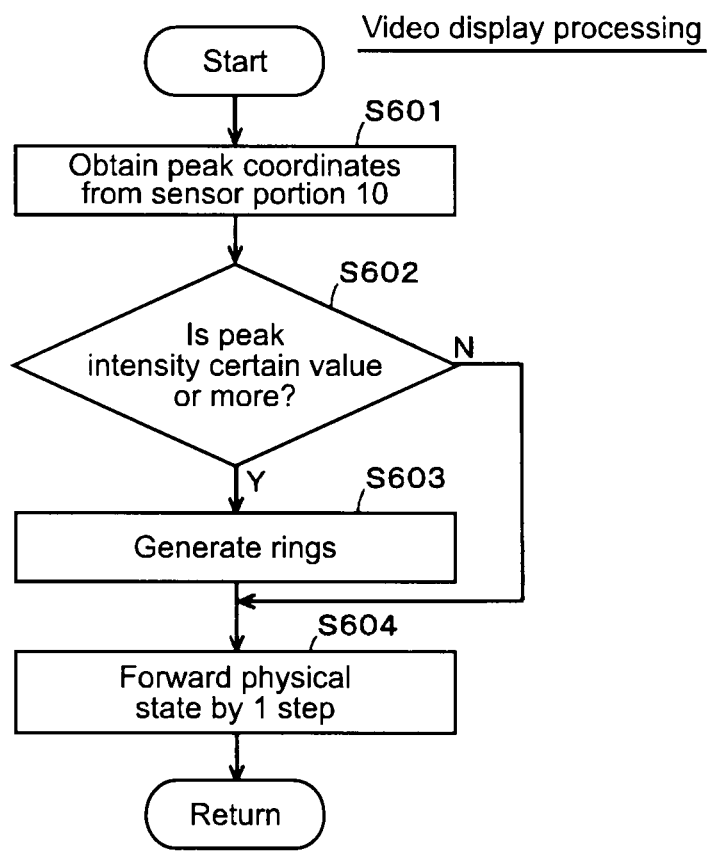
FIG. 31 is a flowchart for explaining video display processing.

Next, video display processing that the spatial position detection portion 405 and the physics calculation processor 408 carry out in cooperation with each other will be described. FIG. 31 is a flowchart for explaining the video display processing that the spatial position detection portion 405 and the physics calculation processor 408 carry out in cooperation with each other.

As described above, in the information processing apparatus of this embodiment, the spatial position detection portion 405 repetitively executes the sensor value detection processing 2 shown in FIG. 18 every certain time period, for example. The spatial position detection portion 405 also repetitively executes the video display processing shown in FIG. 31 every certain time period, for example.

The spatial position detection portion 405 first executes the video display processing shown in FIG. 31 to obtain the peak values detected in the processing shown in FIG. 18 (information indicating position (coordinates) within three-dimensional coordinate space) (Step S601).

Then, the spatial position detection portion 405 judges whether an intensity of the obtained peak values is a certain value or more (Step S602). As in the audio output processing 1 to 3 described above, the process of Step S602 is a process for preventing a situation in which even a case where a hand of the user is accidentally brought close to the sensor panel surface of the sensor portion 10 is targeted for the processing, for example.

When judged in the judgment process of Step S602 that the intensity of the obtained peak values is a certain value or more, the spatial position detection portion 405 controls the physics calculation processor 408 to carry out calculation processing on video information based on a predetermined physics model (Step S603).

Specifically, as described above, a process of generating watering on a displayed video in accordance with a position designated by the user is carried out by using a ring phenomenon as a physics model and a function obtained by combining several Gauss functions as described with reference to FIG. 30.

After that, the physics calculation processor 408 performs calculation processing on the video information so as to forward the physical state by one step (Step S604). Then, the processing shown in FIG. 31 is ended to wait for the next execution timing.

Moreover, when judged in the judgment process of Step S602 that the intensity of the obtained peak values is smaller than a certain value, the process advances to Step S604. Then, the spatial position detection portion 405 controls the physics calculation processor 408 to perform the calculation processing on the video information so as to forward the physical state by one step (Step S604). After that, the processing shown in FIG. 31 is ended to wait for the next execution timing.

As described above, the information processing apparatus of this embodiment is capable of imparting an effect according to a physics model to the video information in accordance with the designated position designated by the detection target object such as a hand of a user within the three-dimensional coordinate space.

It should be noted that although rings have been used as the physics model in this case, the present invention is not limited thereto. By using various physics models other than rings, various effects can be imparted to displayed videos.

It should be noted that as is apparent from the descriptions above, an image display means is realized by the display portion 20 in the video display processing. Moreover, an effect impartment means is mainly realized by the physics calculation processor 408.

(Application)

The information processing apparatus of this embodiment has a function of carrying out the audio output processing and the video display processing as described above. In descriptions below, an application of a case of using those functions will be described.

In the application described below, when an operation is not made with respect to the sensor portion 10, a video corresponding to video information stored in the video information storage portion 406 is displayed on the display screen of the display portion 20 via the physics calculation processor 408 and the display processor 409.

Then, processing of performing display so as to spread rings (watering) from a droplet dropped at an arbitrary position on the displayed video at random timings is carried out by the spatial position detection portion 405 and the CPU 401 controlling the physics calculation processor 408 in cooperation with each other.

At the same time, processing of setting a virtual sound source at a random position and emitting, at a timing at which the droplet falls on the water surface, a sound of the droplet falling on the water surface (droplet sound) from the speaker portion 30 using the wavefront synthesis technique is carried out.

The processing of emitting the droplet sound is carried out by the spatial position detection portion 405 and the CPU 401 controlling the audio processor 410 and the sound field controller 411 in cooperation with each other. Accordingly, it is possible for the user to hear the droplet sound as if it is being emitted from the set virtual sound source.

As described above, it is possible to display, at a time no operation is made with respect to the sensor portion 10, a video in which droplets are dropped on the displayed image at random timings and positions and rings are spread thereon. At the same time, at the timing at which the displayed droplet falls on the water surface, the droplet sound can be emitted from the speaker portion 30 as if it is being emitted from an arbitrary position.

Further, when an operation is made with respect to the sensor portion 10, that is, when the detection target object such as a hand of a user is brought close to the sensor panel 10P, rings are generated on the displayed video in accordance with the position designated by the detection target object.

In this case, as described above, the spatial position detection portion 405 mainly controls the physics calculation processor 408 to perform display so as to generate rings from a position on the display screen corresponding to the position designated by the detection target object.

Also in this case, the audio output processing of Example 3 that has been described with reference to FIG. 27 is carried out. In other words, audio information is stored in the audio information storage portion 407 in the form described with reference to FIGS. 20 and 21.

In this regard, the spatial position detection portion 405 judges the area that the detection target object has passed and the area that the detection target object has reached based on the area to which the position designated by the detection target object belongs, and specifies audio information to be mixed. Moreover, at the same time, the spatial position detection portion 405 specifies the speaker to emit audio based on the area to which the position designated by the detection target object belongs.

Based on the specified result, the spatial position detection portion 405 controls the audio processor 410 to adjust the mix volume and the switch circuit of the audio processor 410 and mix the audio information corresponding to the user instruction, and emits audio corresponding to the mixed audio information from the speaker that corresponds to the user instruction.

As described above, the information processing apparatus of this embodiment is capable of differentiating the audio output processing and the video display processing between cases where the user instruction is made and not made to the sensor portion 10.

Next, the video display processing and the audio output processing in the application will be described with reference to the flowcharts of FIGS. 32 and 33.

Figure 32:
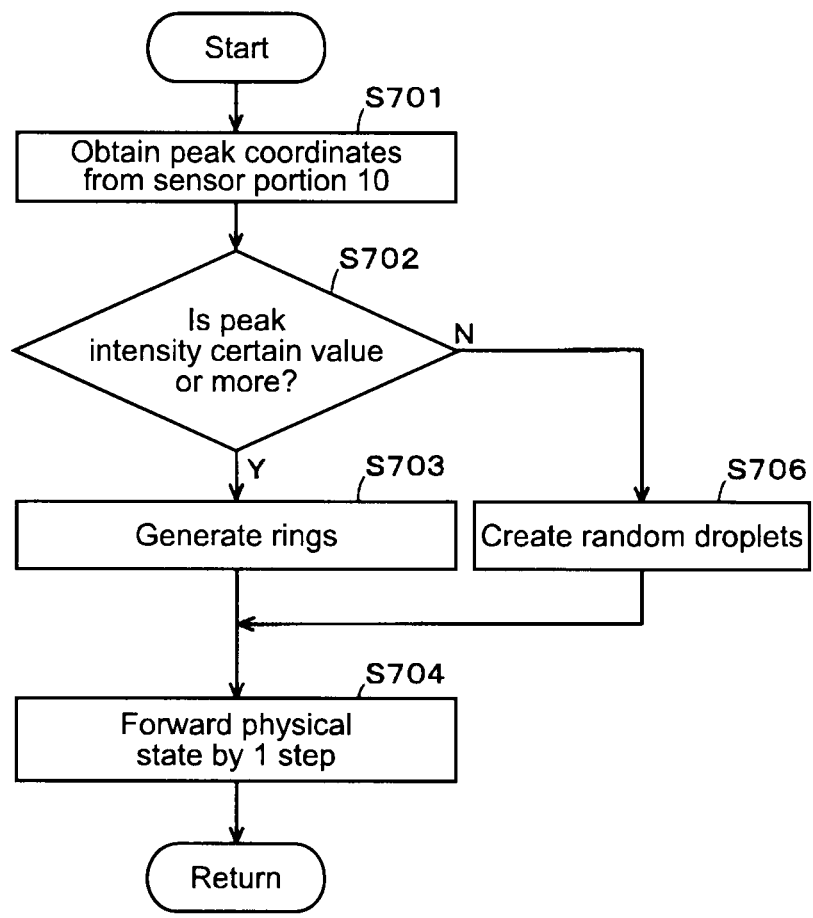
FIG. 32 is a flowchart for explaining an application of video output processing.

FIG. 32 is a flowchart for explaining the video display processing in the application that the spatial position detection portion 405 and the physics calculation processor 408 carry out in cooperation with each other in the information processing apparatus of this embodiment.

As described above, in the information processing apparatus of this embodiment, the spatial position detection portion 405 repetitively executes the sensor value detection processing 2 shown in FIG. 18 every certain time period, for example. The spatial position detection portion 405 also repetitively executes the video display processing shown in FIG. 32 every certain time period, for example.

The spatial position detection portion 405 executes the video display processing shown in FIG. 32 and first obtains the peak values detected in the processing shown in FIG. 18 (information indicating position (coordinates) within three-dimensional coordinate space) (Step S701).

Then, the spatial position detection portion 405 judges whether an intensity of the obtained peak values is a certain value or more (Step S702). As in the audio output processing 1 to 3 described above, the process of Step S702 is a process for preventing a situation in which even a case where a hand of the user is accidentally brought close to the sensor panel surface of the sensor portion 10 is targeted for the processing, for example.

When judged in the judgment process of Step S702 that the intensity of the obtained peak values is a certain value or more, the spatial position detection portion 405 controls the physics calculation processor 408 to carry out a process of generating and displaying rings (Step S703).

Specifically, as described above, using a ring phenomenon as a physics model, watering is generated in a displayed video in accordance with a position designated by the user by carrying out calculation processing on video information using a function obtained by combining several Gauss functions as described with reference to FIG. 30.

After that, the physics calculation processor 408 performs calculation processing on the video information so as to forward the physical state by one step (Step S704). Then, the processing shown in FIG. 32 is ended to wait for the next execution timing.

Moreover, when judged in the judgment process of Step S702 that the intensity of the obtained peak values is smaller than a certain value, the spatial position detection portion 405 controls the physics calculation processor 408 to perform display to generate and drop a droplet (Step S706).

In this case, the position to drop the droplet is determined at random. Moreover, the physics calculation processor 408 carries out the calculation processing so that rings are spread from the position at which the droplet is dropped.

After that, the physics calculation processor 408 performs the calculation processing on the video information so as to forward the physical state by one step (Step S704). Then, the processing shown in FIG. 32 is ended to wait for the next execution timing.

As described above, it is possible to impart an effect to the displayed video such that, when no instruction is made by the user, droplets are dropped randomly on a water surface and rings are spread from the dropped position.

Moreover, it is also possible to impart an effect to the displayed video such that, when an instruction is made by the user, rings are spread from a position on the display screen of the display portion 20 corresponding to the designated position.

Figure 33:
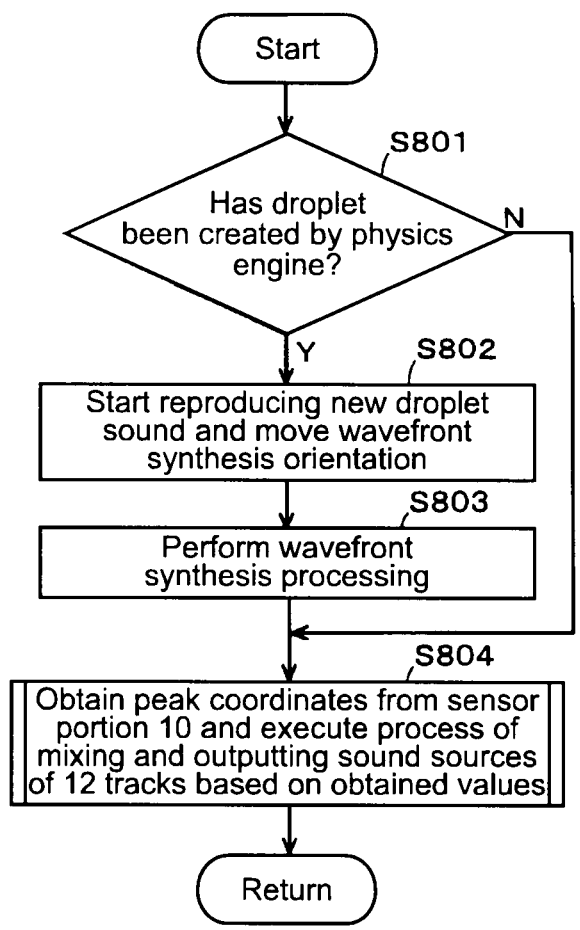
FIG. 33 is a flowchart for explaining an application of audio output processing.

FIG. 33 is a flowchart for explaining the audio output processing in the application that the spatial position detection portion 405, the audio processor 410, and the sound field controller 411 carry out in cooperation with each other in the information processing apparatus of this embodiment.

The processing shown in FIG. 33 is processing executed in association with the video display processing shown in FIG. 32 and processing that the CPU 401, the spatial position detection portion 405, the audio processor 410, and the sound field controller 411 carry out in cooperation with each other.

When the video display processing shown in FIG. 32 is executed, the CPU 401 judges whether the processing of generating and displaying a droplet has been carried out in the physics calculation processor (physics engine) 408 (Step S801).

When judged in the judgment process of Step S801 that a droplet has been generated, the CPU 401 controls the audio processor 410 and the spatial position detection portion 405 to carry out a process of moving a virtual sound source as well as reproduce a new droplet sound (Step S802).

Then, the spatial position detection portion 405 controls the sound field controller 411 and the digital filters of the audio processor 410 so that the droplet sound can be heard as if it is being emitted from the virtual sound source moved in Step S802 (Step S803).

Specifically, the process of Step S803 is a process of setting a virtual sound source by controlling a coefficient of the digital filters of the audio processor 410 using the wavefront synthesis technique and subjecting an audio signal to digital filtering so that audio can be heard as if it is being emitted from that virtual sound source.

After that, the CPU 401 controls the spatial position detection portion 405 and the like and executes the audio output processing 3 described with reference to FIG. 27 (Step S804). Then, the processing shown in FIG. 33 is ended to wait for the next execution timing.

As described above, in this application, even when a user operation is not made with respect to the sensor portion 10, an effect of dropping a droplet and generating rings on a displayed video can be imparted. At the same time, it is possible to reproduce and emit a droplet sound while moving a virtual sound source using the wavefront synthesis technique.

When a user operation is made with respect to the sensor portion 10, an effect of generating rings on a displayed video in accordance with a position designated by the user can be imparted. At the same time, it is possible to specify audio information to be combined based on the area that the detection target object such as a hand of a user has passed and the area that the detection target object has reached to mix them, and emit audio corresponding to the mixed audio information from the speaker corresponding to the position designated by the user.

(Method and Program According to Present Invention)

It should be noted that as is apparent from the above embodiment, a method and program according to the present invention can be realized by the methods and programs described with reference to the flowcharts of FIGS. 9, 10, 18, 19, 27, and 28.

In other words, the methods described with reference to the flowcharts of FIGS. 9, 10, 18, 19, 27, and 28 are the method of the present invention.

In addition, programs that can be structured based on the flowcharts of FIGS. 9, 10, 18, 19, 27, and 28 are the program of the present invention.

(Effect of Embodiment)

By the detection target object such as a hand of a user being brought close to the sensor panel 10P of the sensor portion 10, a capacitance of the sensor panel 10P changes. By controlling an audio output based on a change in measurement values of the capacitance detectable via the sensor portion 10, it is possible to control emission of audio to be reproduced in accordance with a gesture feedback using a hand of a user.

In other words, audio to be reproduced can be reproduced and emitted in accordance with a position of the hand of the user (lateral position and depth with respect to sensor panel 10P). In this case, the position to emit audio, the position of the virtual sound source, the audio mix processing, and the like can be changed in accordance with the gesture using the hand of the user.

By controlling the audio output using an exponent function, the audio output can be shifted within almost the same time irrespective of a shifting amount.

It is also possible to control a screen effect based on the change in the measurement values of the capacitance.

Accordingly, it is possible to control an audio output based on the gesture using the hand of the user and impart a predetermined effect to a displayed video (displayed image). As a result, a new unprecedented information processing apparatus (information-providing apparatus) can be realized.

The information processing apparatus of the above embodiment is capable of realizing, for example, an unprecedented touch panel display that can be used in department stores, showrooms, and the like.

For example, it is possible to change a video of a product and the like and audio (music or guidance) by a gesture of the user (movement of detection target object such as hand) made with respect to the sensor panel 10P.

Moreover, the information processing apparatus of the above embodiment is applicable to, for example, new attractions or guidance in amusement parks including theme parks.

(Others)

It should be noted that as in the above embodiment, in addition to audio information on various songs and the like and various sound effects including a droplet sound, a human voice used in announcements, sounds obtained by combining various pieces of audio information, and the like can be used as reproducible audio information. In other words, it is possible to use various types of reproducible audio information.

Moreover, various still images and moving images can be used as the reproducible video information (image information). In the case of still images, a so-call slideshow in which a plurality of still images are successively reproduced in slides can be used.

Furthermore, it is of course possible to alternately reproduce still images and moving images or reproduce animation images, various CG images, and the like.

The present application contains subject matter related to that disclosed in Japanese Priority Patent Application JP 2009-009439 filed in the Japan Patent Office on Jan. 20, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
    sensor circuitry configured to detect three-dimensional coordinates designated by a spatially-apart detection target object;
    spatial position detection circuitry configured to judge an area designated in advance, that includes at least two-dimensional coordinates of the three-dimensional coordinates detected by the sensor circuitry;
    audio processing circuitry configured to select at least one speaker from plural speakers based on the judged area; and
    speaker circuitry configured to output audio corresponding to audio information from the selected at least one speaker,
    wherein the spatial position detection circuitry is configured to adjust the three-dimensional coordinates as a detection output within a predetermined time range based on a predetermined function using a current detection output and a previous detection output from the sensor circuitry, and
    wherein the audio processing circuitry is configured to change the audio information to be used based on the three-dimensional coordinates adjusted by the spatial position detection circuitry.

2. The information processing apparatus according to claim 1, wherein the speaker circuitry is configured to output, based on the judged area, the audio corresponding to the audio information from the selected at least one speaker based on the adjusted three-dimensional coordinates.

3. The information processing apparatus according to claim 2,
wherein the sensor circuitry is configured to detect the three-dimensional coordinates designated by a hand of a user as the spatially-apart detection target object,
the information processing apparatus further comprising processing circuitry configured to estimate a position of the user based on the three-dimensional coordinates detected by the sensor circuitry,
wherein the speaker circuitry outputs the audio corresponding to the audio information from the selected at least one speaker based on the position of the user estimated by the processing circuitry.

4. The information processing apparatus according to claim 2, further comprising
audio information storage circuitry configured to store the audio information for each of a plurality of layers set in accordance with a distance from a sensor surface of the sensor circuitry,
wherein the speaker circuitry is configured to judge, based on the judged area, a layer to which the three-dimensional coordinates detected by the sensor circuitry belongs and to output the audio information that is stored by the audio information storage circuitry corresponding to the judged layer.

5. The information processing apparatus according to claim 1,
wherein the speaker circuitry is configured to specify, based on the judged area, a first layer that the spatially-apart detection target object has passed and a second layer that the spatially-apart detection target object has reached, and to mixedly output a first stored audio information corresponding to the first layer that the spatially-apart detection target object has passed and a second stored audio information corresponding to the second layer that the spatially-apart detection target object has reached.

6. The information processing apparatus according to claim 5,
wherein the audio information storage circuitry is configured to store the first audio information and the second audio information, and
wherein the speaker circuitry is configured to specify, based on the judged area, a first area of the first layer that the spatially-apart detection target object has passed and a second area of the second layer that the spatially-apart detection target object has reached, and to mixedly output the first stored audio information corresponding to the first area of the first layer that the spatially-apart detection target object has passed and the second stored audio information corresponding to the second area of the second layer that the spatially-apart detection target object has reached.

7. The information processing apparatus according to claim 2, further comprising:
image display circuitry; and
processing circuitry configured to impart, when the judged area indicates that the three-dimensional coordinates are included in the area designated in advance, a predetermined effect to a video signal supplied to the image display circuitry in accordance with a predetermined physics model using the three-dimensional coordinates.

8. The information processing apparatus according to claim 1, wherein the at least one speaker is selected from among plural speakers based on the area designated in advance.

9. An information processing method, comprising:
detecting, using sensor circuitry, three-dimensional coordinates designated by a spatially-apart detection target object;
judging, using spatial position detection circuitry, an area designated in advance, that includes at least two-dimensional coordinates of the three-dimensional coordinates detected in the detecting;
selecting at least one speaker from plural speakers based on the judged area;
outputting, using speaker circuitry, audio corresponding to audio information from the selected at least one speaker;
adjusting, using the spatial position detection circuitry, the three-dimensional coordinates as a detection output within a predetermined time range based on a predetermined function using a current detection output and a previous detection output from the sensor circuitry; and
changing, using audio processing circuitry, the audio information to be used based on the three-dimensional coordinates adjusted by the spatial position detection circuitry.

10. The information processing method according to claim 9, wherein the at least one speaker is selected from among plural speakers based on the area designated in advance.

11. A non-transitory computer-readable storage medium storing computer-readable instructions thereon, which, when executed by a computer, cause the computer to perform an information processing method comprising:
detecting, using sensor circuitry, three-dimensional coordinates designated by a spatially-apart detection target object;
judging, using spatial position detection circuitry, an area designated in advance, that includes at least two-dimensional coordinates of the three-dimensional coordinates detected in the detecting;
selecting at least one speaker from plural speakers based on the judged area;
outputting, using speaker circuitry, audio corresponding to audio information from the selected at least one speaker;
adjusting, using the spatial position detection circuitry, the three-dimensional coordinates as a detection output within a predetermined time range based on a predetermined function using a current detection output and a previous detection output from the sensor circuitry; and
changing, using audio processing circuitry, the audio information to be used based on the three-dimensional coordinates adjusted by the spatial position detection circuitry.

12. The non-transitory computer-readable storage medium according to claim 11, wherein the at least one speaker is selected from among plural speakers based on the area designated in advance.

13. An information processing apparatus, comprising:
a sensor circuitry portion configured to detect three-dimensional coordinates designated by a spatially-apart detection target object;
a judgment circuitry portion configured to determine an area designated in advance, that includes at least two-dimensional coordinates of the three-dimensional coordinates detected by the sensor circuitry portion;
a selection circuitry portion configured to select at least one speaker from plural speakers based on the judged area; and an output circuitry portion configured to output audio corresponding to audio information from the selected at least one speaker, wherein the judgment circuitry portion is configured to adjust the three-dimensional coordinates as a detection output within a predetermined time range based on a predetermined function using a current detection output and a previous detection output from the sensor circuitry portion, and wherein the selection circuitry portion is configured to change the audio information to be used based on the three-dimensional coordinates adjusted by the judgment circuitry portion.

14. The information processing apparatus according to claim 13, wherein the at least one speaker is selected from among plural speakers based on the area designated in advance.

* * * * *